US007899755B2

(12) United States Patent
Whitfield

(10) Patent No.: US 7,899,755 B2
(45) Date of Patent: Mar. 1, 2011

(54) SECURE SYSTEM FOR THE ISSUANCE, ACQUISITION, AND REDEMPTION OF CERTIFICATES IN A TRANSACTION NETWORK

(75) Inventor: Henry Whitfield, Palo Alto, CA (US)

(73) Assignee: S.F. IP Properties 59 LLC, Wilmington, DE (US)

( * ) Notice: Subject to any disclaimer, the term of this patent is extended or adjusted under 35 U.S.C. 154(b) by 554 days.

(21) Appl. No.: 11/686,239

(22) Filed: Mar. 14, 2007

(65) Prior Publication Data

US 2007/0157021 A1 Jul. 5, 2007

Related U.S. Application Data

(63) Continuation of application No. 09/472,100, filed on Dec. 20, 1999, now Pat. No. 7,209,889.

(60) Provisional application No. 60/113,706, filed on Dec. 24, 1998.

(51) Int. Cl.
*G06Q 20/00* (2006.01)
(52) U.S. Cl. ............................ 705/76; 705/64; 705/65; 705/75; 705/26; 705/27; 705/52; 705/53; 705/54; 235/379; 340/825; 902/2
(58) Field of Classification Search .................. 705/64, 705/65, 75, 76, 27, 40, 52, 53, 54; 235/379; 340/825; 902/2
See application file for complete search history.

(56) References Cited

U.S. PATENT DOCUMENTS 4,303,852 A 12/1981 Silverman et al.

4,341,100 A 7/1982 Kohlhage
4,464,566 A 8/1984 Silverman et al.

(Continued)

FOREIGN PATENT DOCUMENTS

DE 19542732 5/1997

(Continued)

OTHER PUBLICATIONS

Microsoft Internet Commerce Strategy—A Foundation for Doing Business on the Internet, www.microsoft.com/commerce/whitepaper.htm May 1997 18ppg retrieved from the IDS.*

(Continued)

*Primary Examiner*—James A Reagan
(74) *Attorney, Agent, or Firm*—McDonnell Boehnen Hulbert & Berghoff LLP

(57) ABSTRACT

A transaction network contains a networked certificate authority, by which one or more virtual certificates may be remotely defined and stored, such as by an issuer user through a issuer web portal interface. An acquirer user, through an acquirer web portal interface, may acquire one or more virtual certificates, which contain a secret public key portion, as well as a corresponding private key, which is established by the acquirer at the time of acquisition, and is stored at the certificate authority. At a redemption location associated with an acquired certificate, the acquirer (or an alternate recipient of an acquired certificate to whom the acquirer has communicated the established private key), submits the certificate information, along with the established private key, to redeem the certificate.

24 Claims, 16 Drawing Sheets

U.S. PATENT DOCUMENTS

| | | | |
|---|---|---|---|
| 4,599,509 | A | 7/1986 | Silverman et al. |
| 4,669,730 | A | 6/1987 | Small |
| 5,001,752 | A | 3/1991 | Fischer |
| 5,019,694 | A | 5/1991 | Collins, Jr. |
| 5,136,643 | A | 8/1992 | Fischer |
| 5,157,726 | A | 10/1992 | Merkle et al. |
| 5,379,344 | A | 1/1995 | Larsson et al. |
| 5,453,601 | A | 9/1995 | Rosen |
| 5,455,407 | A | 10/1995 | Rosen |
| 5,500,514 | A | 3/1996 | Veeneman et al. |
| 5,513,117 | A | 4/1996 | Small |
| 5,533,123 | A | 7/1996 | Force et al. |
| 5,557,518 | A | 9/1996 | Rosen |
| 5,613,012 | A | 3/1997 | Hoffman et al. |
| 5,615,268 | A | 3/1997 | Bisbee et al. |
| 5,621,797 | A | 4/1997 | Rosen |
| 5,629,980 | A | 5/1997 | Stefik et al. |
| 5,634,012 | A | 5/1997 | Stefik et al. |
| 5,638,443 | A | 6/1997 | Stefik et al. |
| 5,642,419 | A | 6/1997 | Rosen |
| 5,652,421 | A | 7/1997 | Veeneman et al. |
| 5,659,616 | A | 8/1997 | Sudia |
| 5,661,517 | A | 8/1997 | Budow et al. |
| 5,666,416 | A | 9/1997 | Micali |
| 5,671,279 | A | 9/1997 | Elgamal |
| 5,677,955 | A | 10/1997 | Doggett et al. |
| 5,706,442 | A | 1/1998 | Anderson et al. |
| 5,710,886 | A | 1/1998 | Christensen et al. |
| 5,748,738 | A | 5/1998 | Bisbee et al. |
| 5,761,648 | A | 6/1998 | Golden et al. |
| 5,764,789 | A | 6/1998 | Pare, Jr. et al. |
| 5,799,086 | A | 8/1998 | Sudia |
| 5,802,199 | A | 9/1998 | Pare, Jr. et al. |
| 5,805,719 | A | 9/1998 | Pare, Jr. et al. |
| 5,812,668 | A | 9/1998 | Weber |
| 5,816,918 | A | 10/1998 | Kelly et al. |
| 5,822,737 | A | 10/1998 | Ogram |
| 5,838,812 | A | 11/1998 | Pare, Jr. et al. |
| 5,839,119 | A | 11/1998 | Krsul et al. |
| 5,850,442 | A | 12/1998 | Muftic |
| 5,850,446 | A | 12/1998 | Berger et al. |
| 5,870,718 | A * | 2/1999 | Spector ............ 705/26 |
| 5,870,723 | A | 2/1999 | Pare, Jr. et al. |
| 5,878,337 | A | 3/1999 | Joao et al. |
| 5,889,863 | A | 3/1999 | Weber |
| 5,907,801 | A | 5/1999 | Albert et al. |
| 5,915,019 | A | 6/1999 | Ginter et al. |
| 5,915,093 | A | 6/1999 | Berlin et al. |
| 6,000,832 | A | 12/1999 | Franklin et al. |
| 6,070,171 | A | 5/2000 | Snyder et al. |
| 6,134,591 | A | 10/2000 | Nickles |
| 6,170,744 | B1 | 1/2001 | Lee et al. |
| 6,193,155 | B1 | 2/2001 | Walker et al. |
| 6,240,397 | B1 | 5/2001 | Sachs |
| 6,330,544 | B1 | 12/2001 | Walker et al. |
| 6,490,367 | B1 * | 12/2002 | Carlsson et al. ............ 382/137 |
| 2002/0062286 | A1 | 5/2002 | Tedesco et al. |

FOREIGN PATENT DOCUMENTS

| | | |
|---|---|---|
| EP | 0148960 | 7/1985 |
| EP | 0421673 | 4/1991 |
| EP | 0547837 | 6/1993 |
| EP | 0715243 | 6/1996 |
| EP | 0715244 | 6/1996 |
| EP | 0715245 | 6/1996 |
| EP | 0715246 | 6/1996 |
| EP | 0715247 | 6/1996 |
| EP | 0784282 | 7/1997 |
| EP | 0785515 | 7/1997 |
| EP | 0785516 | 7/1997 |
| EP | 0785517 | 7/1997 |
| EP | 0788066 | 8/1997 |
| EP | 0803827 | 10/1997 |
| EP | 0833285 | 4/1998 |
| WO | 92/15968 | 9/1992 |
| WO | 96/26505 | 8/1996 |
| WO | WO 9626505 * | 8/1996 |
| WO | 97/05555 | 2/1997 |
| WO | 97/23838 | 7/1997 |

OTHER PUBLICATIONS

Hawaiian to Offer Tickets Through ATMSs, Jan. 6, 1998, Wall Street Journal, Estern Edition, p. 1 (Proquest).

Clark, Tim, Year of Digital Certificates?, www.news.com:80, Jan. 9, 1998.

Wells, Ken, "Rude Ape is a Top Banana in the Booming Market for Used Television Ads," The Wall Street Journal, Mar. 20, 1992.

Gardner, E., "Finding a Niche as the Web's Coupon Source," www.interworld.com/print/1998/03. Mar. 23, 1998.

American Express and Internet purchasing roundtable announce standard for corporate purchasing over the internet, About American Express, www.americanexpress.com/corp/latestenews/roundtable/shtml.

Riedman, P., "Electronic greeting competition intensifies," Advertising Age, Oct. 1998, www.adage.com:80/interactive/articles/19981919/article2.html.

Microsoft Internet Commerce Strategy, A Foundation for Doing Business on the Internet, www.microsoft.com/commerce/whitepaper.htm.

Bellare, M., et al., iKP-A Family olf Secure Electronic Paymetn Protocols, Jul. 1995, IBM Research Laboratory.

Ferguson, N., Single Term Off-Line Coins, 1991, CWI.

Hewlett-Packard, Financial Transaction Models in the Electronic World, Jun. 1999, Hewlett-Packard Labratories, Bristol.

Mao, W., A Secure, Cheap, Scalable and Exportable/Importable Method for Internet Electronic Payments, May 1995, Hewlett-Packard Labratories, Bristol.

Mao, W., Financial Transaction Models in the Electronic World, Jun. 1995, Hewlett-Packard Labratories, Bristol.

Strategic Partners, www.webcertificate.com:80/webcert/default.asp.

Van Heerreweghen, E. For Your Information, Feb. 1996, ZIP-CERT.

Van-Herreweghen, E., Zurich iKP Prototype, Feb. 1996, IBM Zurich Research.

http://www.ticketweb.com.

http://www.citium.com.

http://www.craigslist.org.

http://www.gartner.com?DisplayDocument?

www.trellix.com.

http://www.senteacher.org/wk/certificates.php.

"Ticketmaster.com to offer PC-printable tickets," Greg Sandoval, CNET News.com, Jan. 24, 2000; http://news.com.com/2100-1017-236020.html.

http://www.fandango.com.

http://www.giftcerticates.com.

http://www.giveanything.com.

http://webcertificate.com/webcert/.

http://www.pajamagram.com/giftcertificates.html.

http://store.thetech.org/tecmusgifcer.html.

http://www.dealcatcher.com/coupons~view__type=1-category=54.

http://www.givefun.com/.

http://www.quickgifts.com/give.asp.

http://www.parkingticket.com/giftcertificates.

http://fapp.stores.yahoo.net/giftcertificates.html.

"Catuity Recives Notice of Allowance on Major US Patent; 3rd Patent Stream from Innovative Loyalty Software Solutions Company," CR80 news, Detroit Business Wire, Jan. 12, 2003 http://www.cr80news.com/news/2003/01/12/catuity-receives-noitce-of-allowance-on-major-us-patent-htird-in-patent-stream-from-innovative-loyalty-software-solutions-company/.

"Utix Group hopes new patent is ticket to new growth," Lisa van der Pool. Boston Business Journal, Jul. 28, 2006; http://boston.bizjournals.com/boston/stories/2006/07/31/story7.html?i-51310&b=1154318400%5E1322507.
http://worldgoingby.com/pocketsnaps/gc.html.
http://postfuture.com/pfweb/products_printathome.asp.
http://www.desori.com/gifts.php.
http://www.internetcash.com/fgo/0,1383,buy,00.html.
http://www.telserra.net/pdf/company_brochure.pdf.
http://72.14.203.104/search?q=cache:-io8FPXSqEMJ:www.entriq.com/pdfs/ds_ms_commercecare.pdf+prepaid+downloadable+%22patent+pending%22&hl=en&gl=us&ct=clnk&cd=3 (MediaSphere).
https://www.secretcashcard.com/index.php?kbid=1355.
http://www.airprintnetworks.com/news.html.
http://www.mbo.com/web/index.jsp.
http://www.nytheatre.com/nytheatre/vc.thm.
http://www.clicknprinttickets.com/.
http://www.says-it.com/concertticket/.
Wireless Point of Sale Terminal for Credit and Debit Payment Systems, Conference Proceedings, IEEE Canadian Conference on Electrical and Computer Engineering, 1998 (IEEE).
Is Off-line Debit about to Derail?, ABA Banking Journal, vol. 89, No. 9, p. 66, 68, 70 (Sep. 1997) [ABA].
www.gifttracker.com.
www.webcertificates.com.
www.flooz.com.
1988: Year of the Debit Card, Bank Systems & Equipment, vol. 24, No. 11, p. 16-18 (Nov. 1987).
GiftPoint.com: Specializing in Corporate Gift Certificates, Jan. 20, 2000, M.A. mills, InternetNews.com.
"Where to Find . . . Gift Certificates," Specials and Freebies, Nov. 1999, vol. 5, Issue 11, Smart Computing.
"GiftPoint.com Goes With Be Free Affiliate Program," Jun. 9, 1999; Beth Cox- InternetNews.com; http://www.internetnews.com/bus-news/article.php/289791.
http://storagebymail.com/company.php.
Lynch, Russ, Honolulu Star Bulletin Business; "Travel Agency fights ATM coupons," Sep. 15, 1998.
Lynch, Russ, Honolulu Star Bulletin Business: "Bankoh loses round in ATM air coupon hearing," Oct. 23, 1998.
Hawaiian Airlines News Release; Business Wire; Hawaiian Airlines Interisland Flight Coupons to be Sold at Selected Automated Teller Machines; Jan. 8, 1998.

* cited by examiner

Fig. 1

SECURE SYSTEM FOR THE ISSUANCE, ACQUISITION, AND REDEMPTION OF CERTIFICATES IN A TRANSACTION NETWORK

CROSS REFERENCE TO RELATED APPLICATIONS

This application is a Continuation of U.S. patent application Ser. No. 09/472,100, filed Dec. 20, 1999, now U.S. Pat. No. 7,209,889, which claims the benefit of U.S. provisional application No. 60/113,706, filed Dec. 24, 1998. The '100 application is incorporated herein in its entirety by this reference thereto.

FIELD OF THE INVENTION

The invention relates to the field of certificate systems. More particularly, the invention relates to a certificate system for the controlled and secure issuance, acquisition and redemption of single-use certificates in a transaction network.

BACKGROUND OF THE INVENTION

The quickly expanding internet provides a variety of on-line commerce structures and processes, allowing online browsing and sales through a variety of dedicated retail websites, which typically offer one or more products. An inventory of products, which are typically stocked at one or more remote warehouse or related retail locations, are offered for sale through a web site. A purchaser, upon selecting a desired product, typically enters purchase information, such as credit card information and shipping information. Upon credit card authorization, typically when the items are shipped to the designated shipping address, the authorized card information is used to transfer monetary funds from the purchaser's credit account to the seller's bank account. While such on-line commerce systems provide adequate purchasing opportunities for buyers who have access to the Internet, typically for the purchase of smaller items which are readily sent (e.g. such as through postal services), such online commerce does not typically allow a buyer to conveniently pick up merchandise locally.

As well, there is an increasing development for systems which enhance the automation of on-line and off-line commerce, as evidenced by on-line payment systems, point of sale terminals, and debit cards. Related documents include *Making the World Go Round (Online Payments)*, Internet Business, no. 24, p. 2830 (January 1999); *Wireless Point of Sale Terminal for Credit and Debit Payment Systems*, Conference Proceedings, IEEE Canadian Conference on Electrical and Computer Engineering, (1998); *Is Off-line Debit about to Derail?*, ABA Banking Journal, vol. 89, no. 9, p. 66, 68, 70 (September 1997); 1998*: Year of the Debit Card*, Bank Systems & Equipment, vol. 24, no. 11, p. 16-18 (November 1987).

I. Krsul, J. Mudge, and A. Demers, Method Electronic Payments that Prevents Double-Spending, U.S. Pat. No. 5,839,119 (17 Nov. 1998) and corresponding European Patent Application No. 0833285, Method and Product for Generating Electronic Tokens, (filed 25 Sep. 1997) disclose a "method of generating electronic monetary tokens that supports off-line transactions while preventing double-spending. Generation of electronic token halves by a financial services provider begins in response to a request from a buyer to generate monetary tokens to be used with an identified seller. First, the financial services provider generates a plurality of electronic monetary tokens. Second, the provider splits each monetary token into two electronic token halves and associates with each the same serial number. These electronic token halves when combined recreate the electronic money token from which they were generated, but buy themselves neither electronic token half has any value. Nor can either electronic token half by itself be used to create the electronic monetary token without the token half's mate. After splitting all the monetary tokens, the services provider assigns a half of each electronic token to the seller and the other half of each electronic token to the buyer. The buyer and seller can now engage in multiple transactions off-line of the financial services provider". While Krsul et al disclose a method of generating electronic monetary tokens, they fail to disclose a system for issuer-defined virtual certificates which are acquired on-line during a first transaction in which an acquirer establishes a secure private key that is associated with the acquired certificate, and are then selectively redeemed off-line, using the re-submitted private key to authorize the redemption transaction with the on-line system, and to revoke further use of the acquired certificate.

K. Ginter, V. Shear, F. Spahn and D. Van Wie, Systems and Methods for Secure Transaction Management and Electronic Rights Protection, U.S. Pat. No. 5,915,019 (22 Jun. 1999) disclose systems and methods "for secure transaction management and electronic rights protection. Electronic appliances such as computers equipped in accordance with the present invention help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway"."

Gift Certificate Systems. Traditional gift certificates are typically offered by a small percentage of retail stores. There are often major costs associated in the creation and distribution of paper-based certificates, as well as in the management of in-store redemption. Consumers are thus presented with a narrow range of merchant outlets where certificates can be redeemed. The buyer often has to travel to the store to buy the certificate, and then the recipient has to wait until the buyer sends the paper-based certificate to the recipient. As well, there is often no authorization control on the redemption of the paper-based certificate. Paper-based certificates are often treated as cash, and a lost or stolen certificate usually will not be refunded to the buyer or recipient.

Some dedicated network locations, such as web sites which offer goods and services for a single entity, typically offer the purchase of pre-printed and inventoried paper-based gift certificates, which are typically purchased on-line by a buyer, and then are typically sent to a desired recipient.

As well, aggregated web sites which offer multiple goods and services from multiple sources often offer the similar online purchase of generic certificates, which may then be redeemed on-line by a recipient, such as towards the purchase of inventoried goods, which are subsequently sent to the recipient redeemer.

As well, some web-based companies, such as "www.giftpoint.com" and "www.giftcertificates.com", have recently been established to sell a variety of gift certificates, which inventory and offer for sale a large number of pre-printed gift certificates, typically related to nationally traded products and services (e.g. such as redeemable certificates from Gap Stores, Inc. or Wal Mart, Inc.). While such sites allow a buyer to purchase a certificate online, the range of merchants they support is only a small subset of the already small number of merchants who offer traditional paper-based certificates. Such sites inventory the paper-based gift certificates, and offer the certificates to buyers through the web site. When a paper-based certificate is purchased through the site, funds are typically transferred from the buyer at the time of the transaction, and the stocked paper-based certificate is then sent to the designated recipient. While such sites offer a variety of gift certificates for purchase, the certificates are required to initially be established (i.e. printed and recorded) by each of the businesses, and are then transferred to the site (such as by a purchase transaction), where they are inventoried. While large business entities may have already established paper-based certificates, small issuers (e.g. such as small or localized businesses) often do not have certificate systems of their own.

A similar on-line business, located at "www.gifttracker.com", provides gift certificates which may be purchased online and redeemed locally. The site provides a redemption and retail location search engine, by which an online shopper may search for certificates, based upon redemption type (e.g. such as by toys, books, sports equipment, or women's apparel), as well as by location (e.g. such as by entering by zip code). For a given product type, an online shopper typically enters a zip code (such as the zip code of the shopper, or the postal zip code of a potential recipient of a gift certificate). Based upon the entered postal code, the search engine determines gift certificates which may be redeemed locally within the submitted postal area. While the certificate system implemented by gifttracker.com provides the online purchase of certificates which may be redeemed locally, the system requires an inventory of printed certificates which are supplied by the issuers (e.g. such as conventional printed certificates available from large chain stores). After an on-line purchase transaction, the pre-printed certificates are then packaged and sent to a designated address (e.g. such as the acquirer's address, or an alternate recipient address). Once a pre-printed certificate arrives, such as by a conventional mail service, the pre-printed certificate is then taken by the recipient to a corresponding store. The site does not allow the on-line creation of a remote, electronic gift certificates, such as for issuers that do not have pre-printed certificates. As well, the system inherently requires an associated inventory and distribution system for the pre-printed gift certificates.

Another web-based company which sells certificates is located at "www.webcertificates.com", which enables recipients of a certificate to redeem the certificate from a wide variety of on-line merchants. The site creates a certificate which is similar to a virtual credit card, which is then readily accepted by a wide variety of on-line merchants who accept credit cards as payment for their products and services. However, recipients are required to access the Internet, follow detailed instruction to retrieve their online certificate, and then are required to redeem the certificate at an online location, wherein a product is then shipped.

In an alternate embodiment of a conventional online gift certificate site, a buyer may purchase a "generic" gift certificate, which is then typically given as a gift to a recipient, whereby the generic gift certificate is supplied with a tracking number (which may be sent to a recipient, or may be e-mailed to the recipient?). The recipient may then log on to the gift certificate site, and "redeem" the generic gift certificate by selecting one or more specific gift certificates, which in sum are equal to the designated value of the original generic certificate. However, as with other online business which offer paper-based certificates for sale, the specific certificates are limited to an actual inventory of paper-based gift certificates which are available at that site. Upon redemption of the generic certificate, the specific certificate or certificates are then physically sent to the redeemer.

Another web-based company which sells gift certificates is located at "www.flooz.com", which enables an on-line buyer to purchase and send "on-line" currency, which is only available and usable on the Internet. When a buyer sends a recipient the "on-line" currency, such as by electronic mail, the recipient can then spend the "on-line" currency at one or more online sites which are registered to accept the "on-line" currency for online commerce.

In present embodiments of online commerce, buyers and sellers are linked electronically, at some point in the process, and merchandise (or redeemable paper-based certificates) are shipped to the buyer or alternate recipient, such as from a central warehouse linked to the seller. In such embodiments, there are inherent shipment costs, and there is often shipment delays.

On-line Ticketing Systems. In conventional networked commerce sites which offer tickets (e.g. such as for travel, sports, or entertainment), when a computer user purchases tickets online, a selling sites typically provides the buyer with a serial number (i.e. such as a confirmation or tracking number, or even a general ticket number), such as through an e-mail notification. To receive the tickets, the buyer is then typically required to submit the confirmation or number at a will-call booth, whereby the submitted confirmation number is matched to the tickets (which may be previously printed, or may be printed upon redemption). If the submitted number is correctly matched to the tickets, the tickets are then given to the redeeming person. While such conventional online systems allow the online purchase of tickets, as well as the local pick-up of the purchased tickets, money is typically transferred upon the initial on-line acquisition of the tickets, and whereby anyone submitting the correct tracking number may be given the tickets. The single tracking number is confirmed off-line at the will-call booth and, is not authenticated with the on-line site.

The disclosed prior art systems and methodologies thus provide basic certificate systems, but fail to provide a secure certificate system in which allows issuers to create an virtual inventory of certificates, which may then be acquired online, and then redeemed locally. It would also be advantageous to provide a certificate system which allows customers to establish a private key that is unique to the transaction, which is subsequently used in a redemption transaction to authorize the local redemption with the online system. The development of such a certificate system would constitute a major technological advance.

SUMMARY OF THE INVENTION

A transaction network contains a networked certificate authority, by which one or more virtual certificates may be remotely defined and stored, such as by an issuer user through a issuer web portal interface. The virtual certificates correspond to a product or service denomination which is selected by the issuer, include a public key identifier. An acquirer user may locate and acquire one or more virtual certificates, through an acquirer web portal interface. When a virtual certificate is acquired by an acquirer, a corresponding private key is established by the acquirer, and is stored at the certificate authority in association with a record of the acquired certificate. As well, when the certificate is acquired, the acquirer typically submits payment agent information (e.g. such as credit card information). In one embodiment, funds are transferred during acquisition of the certificate. In a preferred embodiment, authorization for the transfer of funds occurs during the acquisition transaction. Certificate information is typically transferred to the acquirer, or to an alternate recipient, by which the holder of the certificate can redeem the certificate at a redemption location associated with an acquired certificate. The acquirer (or an alternate recipient of an acquired certificate to whom the acquirer has communicated the established private key), submits the certificate information at the redemption location, along with the established private key, to redeem the certificate. Include redemption authorization here and revoke of certificate.

BRIEF DESCRIPTION OF THE DRAWINGS

FIG. 1 is a system block diagram of a transaction network for the issuance, acquisition and redemption of single-use certificates;

DETAILED DESCRIPTION OF PREFERRED EMBODIMENTS

Figure 1:
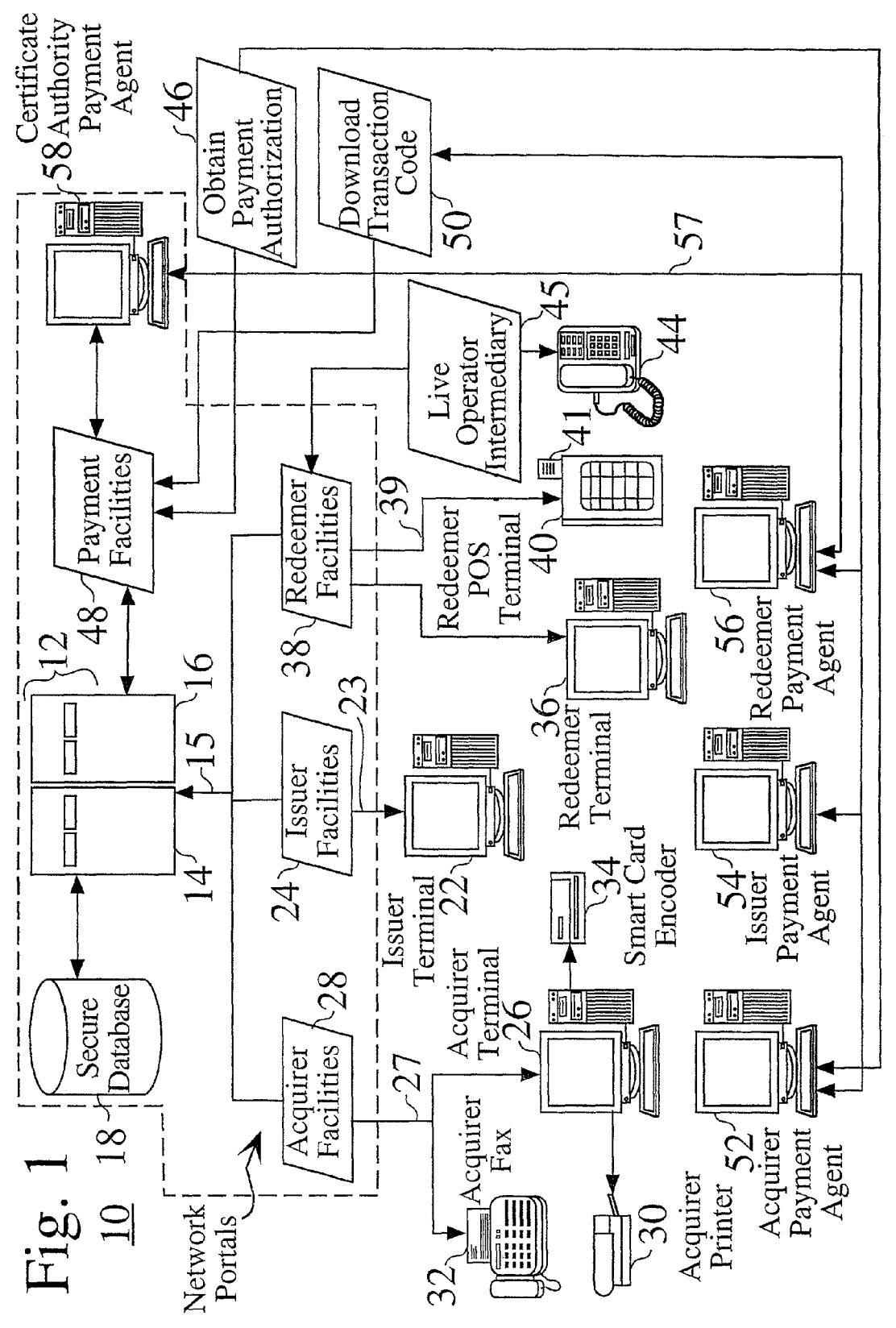
Figure 2:
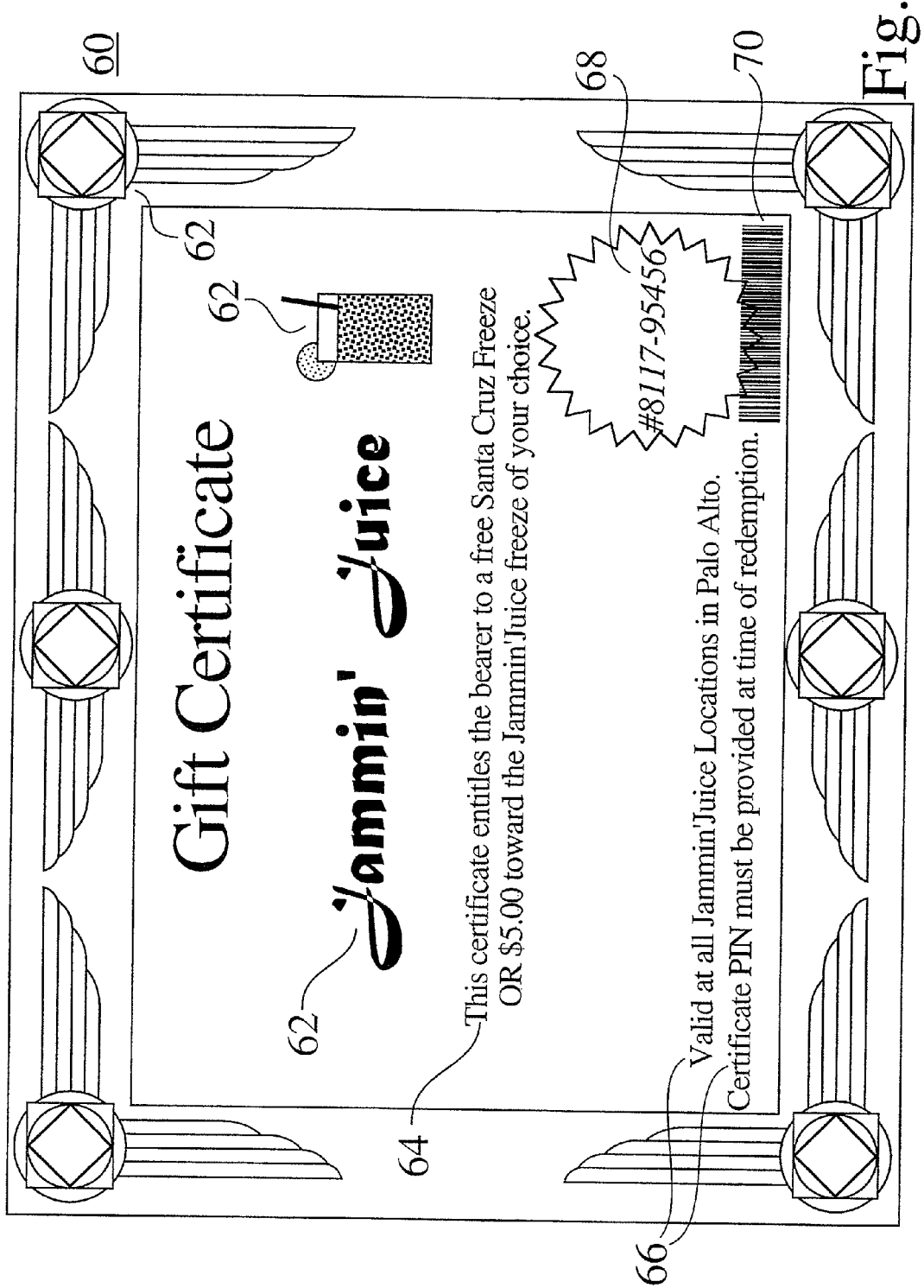
FIG. 2 shows a single-use gift certificate.

FIG. 1 is a system block diagram of a transaction network 10 for the issuance, acquisition and redemption of single-use certificates 60 (FIG. 2). The transaction network 10 contains a networked certificate authority 12, through which one or more virtual certificates 60 are remotely created, such as by an issuer user ISR (FIG. 9) through issuer facilities 24 (e.g. such as through a web portal interface). The virtual certificates 60 typically correspond to sellable commodity, such as a product or service denomination, which is selectable by the issuer user ISR. In an alternate embodiment, the virtual certificates 60 may correspond to a distributable commodity, such as a discount coupon for a product or service, or a reservation (e.g. such as for travel or dining), which is selectable by the issuer user ISR. Created virtual certificates 60 are stored on a database 18 which is associated with the networked certificate authority 12.

An acquirer user ACQ (FIG. 6), accessing the transaction network 10 through an acquirer terminal 26, may locate and acquire one or more virtual certificates 60, through an acquirer facilities 28 (e.g. such as a acquirer web portal interface). When a virtual certificate 60 is acquired by an acquirer user ACQ, a corresponding private key 76 is established by the acquirer user ACQ, and is stored at the certificate authority 12 (e.g. such as within the database 18), in association with a record of the acquired certificate 60, along with other identifying information 98 for the acquired certificate 60.

As well, when a virtual certificate 60 is acquired, the acquirer user ACQ typically submits payment agent information 52 (e.g. such as credit card information). In one embodiment, funds are transferred during acquisition of the certificate 60. In a preferred embodiment, authorization for the transfer of funds occurs during the acquisition transaction 72. Certificate information 98 (FIG. 3) is typically transferred to the acquirer user ACQ, or to an alternate recipient RCP, by which the holder of the acquired certificate 60 can redeem the certificate 60 at a redemption location RL (FIG. 4,8) associated with an acquired certificate 60. The acquirer ACQ (or an alternate recipient RCP of an acquired certificate 60 to whom the acquirer user ACQ has communicated the established private key 76), submits the certificate information at the redemption location, along with the established private key, to redeem the certificate. Include redemption authorization here and revoke of certificate.

Creation of Virtual Certificates. FIG. 2 shows a single-use certificate 60, which may preferably be delivered in a printable form, either to an acquirer user ACQ, or to an alternate recipient RCP. A single-use certificate 60 typically includes one or more design elements 62, a denomination 64, one or more redemption rules 66, and identification information 74 (FIG. 3), which may include human readable information 68, and/or machine readable information 70 (e.g. such as a bar code symbol 70). An issuer user ISR 22 at an issuer terminal 22, in selective electronic communication with a certificate authority 12, has the means (i.e. issuer facilities) 24 to direct the certificate authority 12 to create one or more customized virtual certificates 60, for subsequent issuance to acquirer users ACQ at one or more acquirer terminals 26.

Establishment of Defined Virtual Certificates. Authorization for the construction of certificates typically occurs through an issuer facility 24, such as through a web portal 24 for a transaction network 10 operating across an internet 192, whereby an issuer user ISR (e.g. such as a merchant, or a product manager for a plurality of stores RL) connects to the certificate authority 12 (i.e. such as through a certificate server portion 14 of a certificate authority 12).

The issuer user ISR defines detailed specifications for virtual single-use certificates 60 through a certificate specification interface 194 (FIG. 10), such as design specifications 62 and redemption rules 66, whereby the certificates 60 typically reflect sellable or distributable commodities, such as products and/or services which are available for pick up by a customer, typically at a redemption location RL (e.g. such as at a retail store, a distribution center, a box office, a ticket counter, or at a service provider).

An issuer user ISR 22 has the means 122 (FIG. 5) to control the modular design of one or more virtual certificates 60a-60n independently, either by selecting standard designs offered by the certificate authority 12, by uploading 122 one or more custom designs 62a-62n to the certificate authority 12, in the form of a computer file, or by specifying that a certificate 60 be issued using a combination of stock elements 162 uploaded through the issuer terminal 22. An issuer user may preferably incorporate the denomination 64 of the certificate 60 as an additional element in the certificate identification packet 74. Additionally, an issuer user ISR may preferably incorporate an additional public key segment 82, as a part of the certificate identification packet 74, which may be used, for example, in mapping a certificate 60 to an issuer's coding scheme (e.g. such as to correspond to product serial numbers, part numbers, product color codes, product size, or service codes).

Storage of Virtual Certificates. Each virtual certificate 60 exists, until issued, as a virtual certificate 60 comprised of multiple independent textual elements 64,66 and/or graphical elements 62a-62n, which are stored by the certificate authority 12, in the secure database 18.

Figure 12:
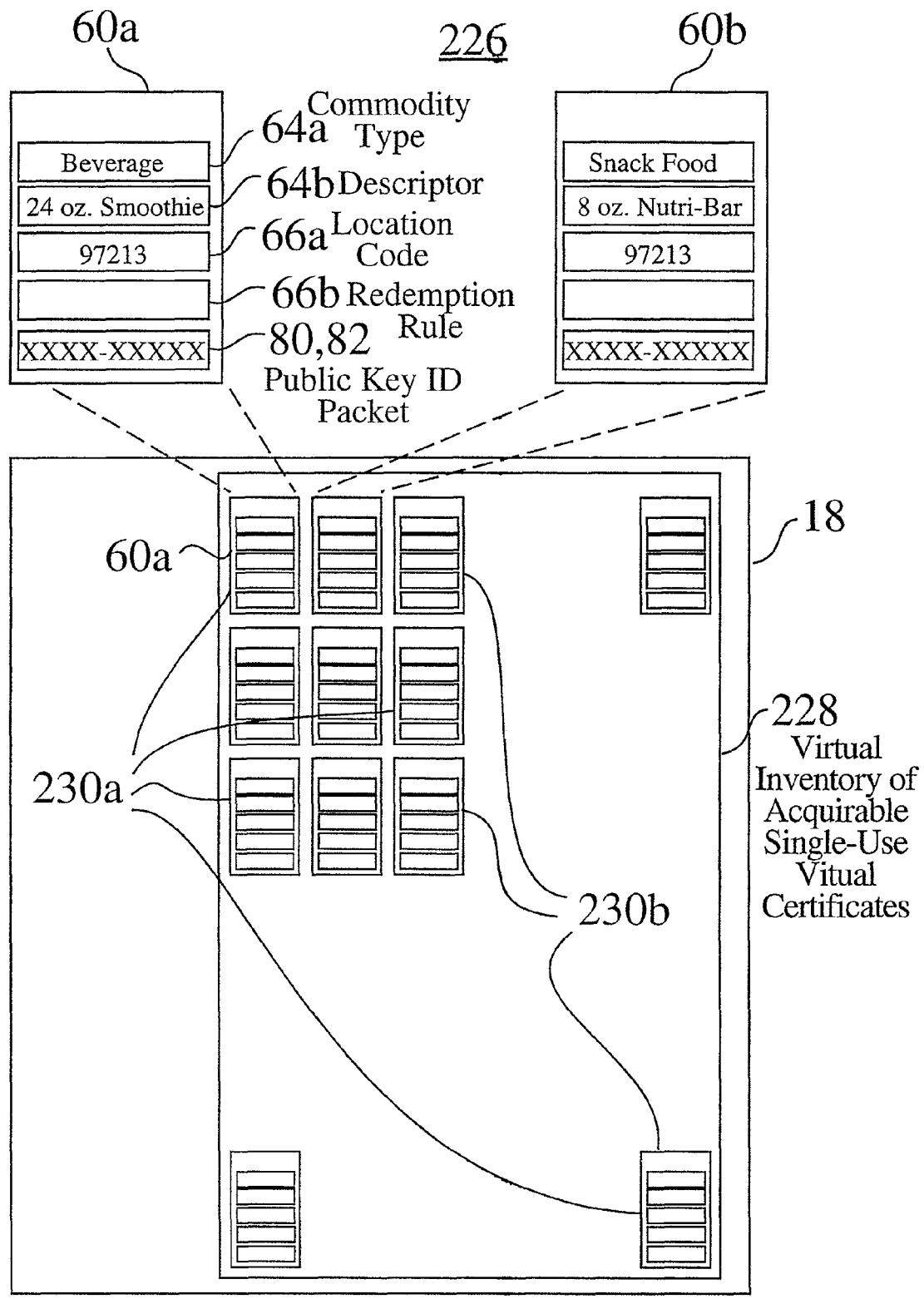
FIG. 12 is a block diagram of a virtual inventory stored within a database.

In one embodiment of the certificate system 10, the certificate authority 12 comprises two functional servers, a certificate server 14, as well as an authentication server 16. In alternate embodiments, a single certificate authority server 12 may perform both certificate establishment functions, as well as certificate redemption functions. In another alternate embodiment, the certificate authority 12, the certificate module 14, the authentication module 16, and the certificate database 18 are integral modules within a certificate authority terminal 58 (FIG. 12).

Figure 3:
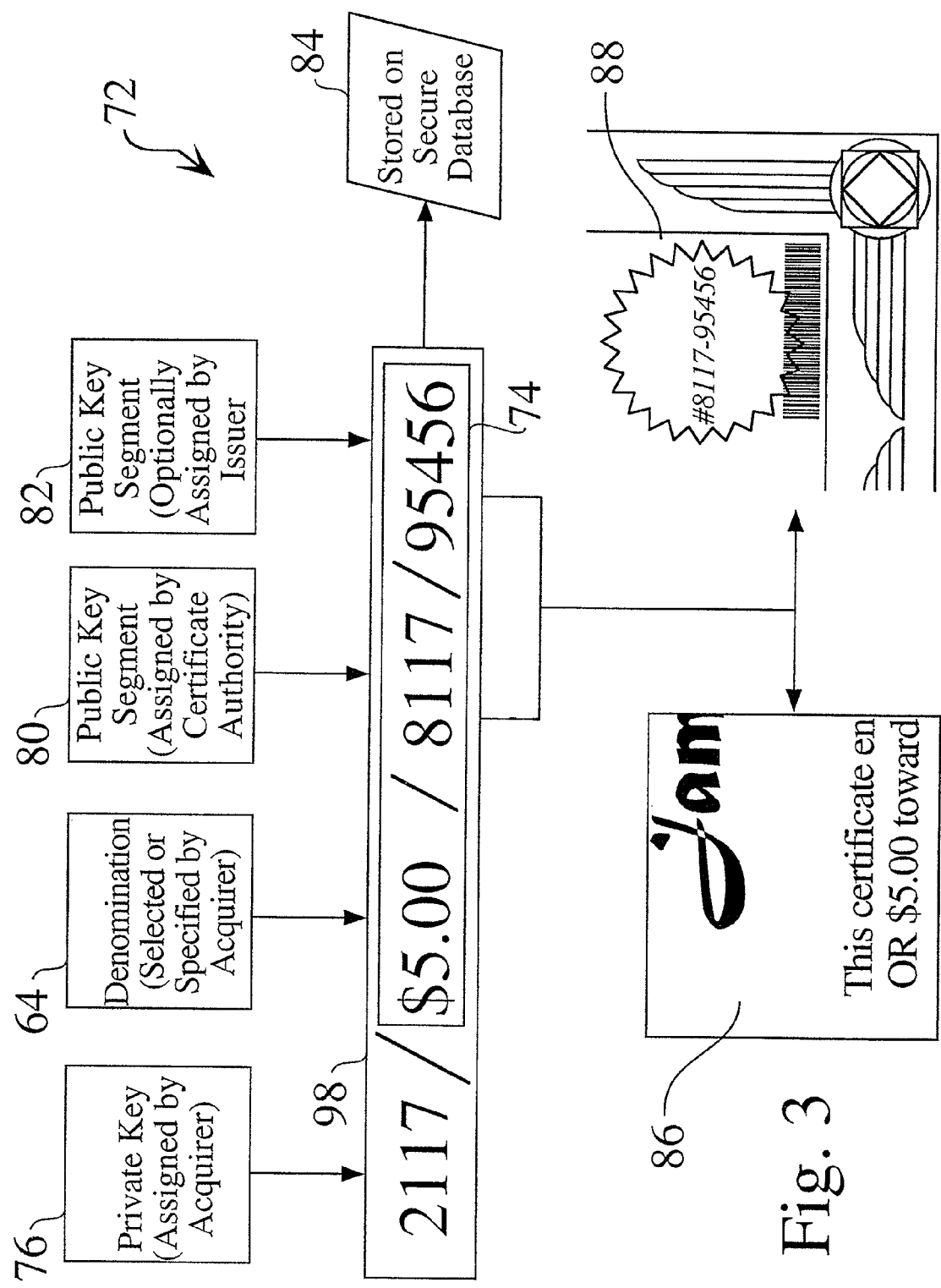
FIG. 3 is a schematic view of a single-use gift certificate identification packet.

Acquisition of Certificates and Establishment of Keys. FIG. 3 is a schematic view of an acquisition transaction 72 for a single-use certificate 60. identification packet 74. During an acquisition transaction 72, an acquirer user ACQ typically provides a means to purchase the certificate, an authorization to purchase during subsequent redemption transaction 104 (FIG. 4), or otherwise qualifies for issuance of the acquired certificate 60.

Certificate acquisition instructions are initially defined by an issuer user ISR at an issuer terminal 22, and are stored at the certificate authority 12, in association with each virtual certificate. Preceding an acquisition transaction 72, an acquirer user ACQ at an acquirer terminal 26, by means of the acquirer facilities 28, typically searches for or browses through a plurality of virtual certificates 60, (i.e. a virtual inventory). An acquirer user ACQ, upon selecting an acceptable virtual certificate 60, may selectably begin an acquisition transaction 72 to acquire the virtual certificate 60.

Before an acquisition transaction 72, a virtual certificate 60 to be acquired is constituted from the independent data elements 62,64,66, 68,70 for the virtual certificate 60, which are stored in the secure database 18, for presentation to the acquirer user ACQ at an acquirer computer terminal 26 (e.g. such as in the form of an HTML document readable through acquirer facilities 28 by an internet browser application). However, after a certificate 60 is acquired during an acquisition transaction 72, the independent data elements 62,64,66, 68,70 are bound together within the database 18.

During an acquisition transaction 72, in which the certificate authority 12 issues a certificate 60 to the acquirer user ACQ, a unique identifier 98 is bound to the issued certificate 60, typically comprising certificate information 74, which appears on the acquired certificate 60, which typically includes a denomination 64, and a secret public key 80 assigned by the certificate authority. In a preferred embodiment, the certificate information 74 includes a supplementary public key segment 82, which is assigned by an issuer user ISR. The certificate information 74 typically appears on the acquired certificate 60 through a printed number 68, or through an encoded symbol, such as a bar code 70 (FIG. 2). The unique certificate identifier 98 includes the elements associated with the certificate information 74, in combination with a private key 76, which is assigned to the certificate 60 by an acquirer user 92, as a part of the acquisition transaction 72.

The private key 76, which is assigned to the certificate 60 by an acquirer user 92, does not appear on the certificate 60, and is known only to the acquirer user ACQ, but is stored by the certificate authority 12, in association with the other data elements relating to the certificate 60, on the secure database 18.

Figure 4:
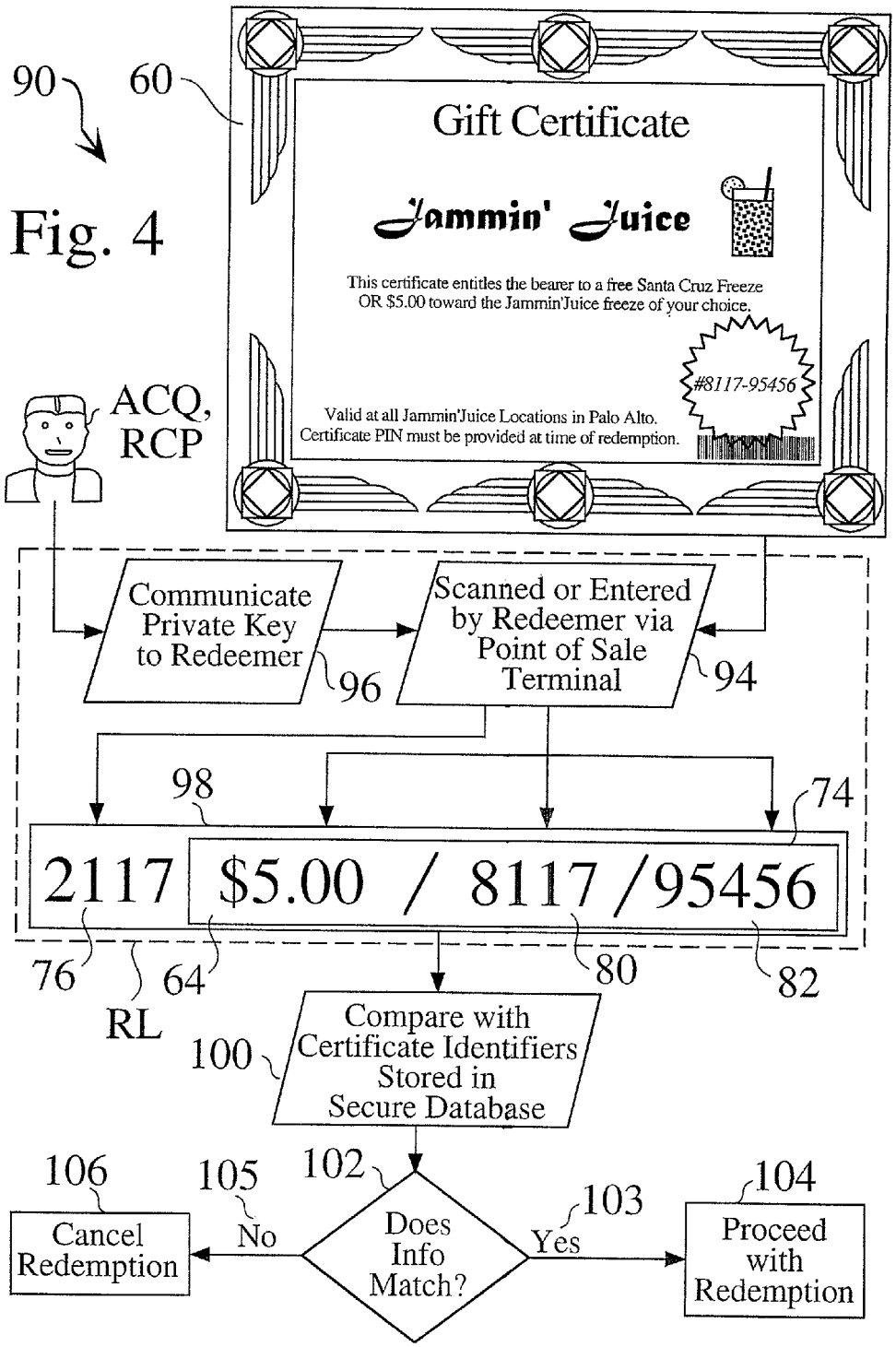
FIG. 4 shows a redemption process for a single-use gift certificate having an identification packet and an associated private key.

Redemption of Certificates. FIG. 4 shows a redemption process 90 for a single-use gift certificate 60 having a submitted identification packet 98, which includes and an associated private key 76. The private key 76 must be provided to the redeemer 36 as part of the redemption process 90 by the acquirer user ACQ (FIG. 4), or by a third party and/or agent to whom the acquirer ACQ has communicated the private key 76. A redemption clerk RC, such as a sales clerk, through a redeemer terminal 36, in communication with the certificate authority 12, by means of the redeemer facilities 38, or optionally, by means of a live operator intermediary 42, may authenticate a certificate 60, by providing the certificate authority 12 with the unique identification information 98 associated with the acquired certificate 60 (i.e. both the public keys 80,82 assigned to the certificate upon issuance, a denomination 64, as well as the unique private identification information 76 which is assigned to the certificate 60 by the acquirer user. ACQ (i.e. the private key 76).

In alternate embodiments of the certificate system 10, either the redemption clerk RC or the holder of the acquired certificate 60 can manually or automatically upload the certificate information 76 during a redemption process 90, such as through a point of sale terminal 40. As well, either the redemption clerk RC or the holder of the acquired certificate 60 can enter the private key PIN 76 into a point of sale terminal 40.

Authorization of Certificate During Redemption. The certificate authority 12 authenticates a certificate 60, on the basis of the certificate identification packet 74 (which includes the public key 80 and supplementary public key 82), and the private key 76 submitted by a redemption clerk RC, such as through redemption terminal 36. As seen in comparison step 100 in FIG. 4, the certificate authority 12 queries the secure database 18, which stores the independent elements associated with the acquired certificate 60, to determine whether the certificate identification packet 74 and the private key 76 originally associated with the certificate 60 on issuance matches the certificate identification packet 74 and private key 76 identification information provided to the certificate authority 12 by the redeemer, as shown in matching step 102. If the unique identification sets correlate 103, the certificate authority 12 validates the certificate 60, and upon instructions by the redemption clerk RC, authorizes the redemption transaction 104. If the unique identification sets do not correlate 105, the certificate authority 12 typically cancels 106 the redemption transaction 104, either by requesting that the acquirer ACQ resubmit the certificate information 74 and the private key 76, or by revoking the certificate 60 (e.g. such as if the certificate 60 has previously been marked as used).

Authorized Redemption Transaction and Cancellation of Single-Use Certificate. Upon a successful authorization transaction 104 of an acquired certificate 60, the certificate authority 12 allows the redemption clerk RC to proceed with redemption of the certificate 60, and revokes the single-use certificate 60 (i.e. thus preventing further use of the certificate information 74,76). The certificate authority revokes the certificate 60 by updating the certificate information stored on the secure database 18 (e.g. by marking the certificate as "used"). In one embodiment of the certificate system 10, the certificate authority 12, by means of certificate payment facilities 48, initiates the transfer of payments between the parties of the acquisition transaction 76 and the redemption transaction 104, by issuing transfer instructions to the certificate payment agent 58, the acquirer payment agent 52, the issuer payment agent 54, and the redeemer payment agent 56.

When a redemption transaction 104 is successfully authorized by the certificate authority 12, the certificate authority 12 preferably downloads a transaction code 181 (FIG. 8) to the redemption terminal 36, which preferably becomes part of a redemption record 41 (FIG. 1) by the redemption location RL, and is also preferably transferred to the acquirer user ACQ or alternate recipient RCP (e.g. such as within a redemption receipt 41).

Figure 5:
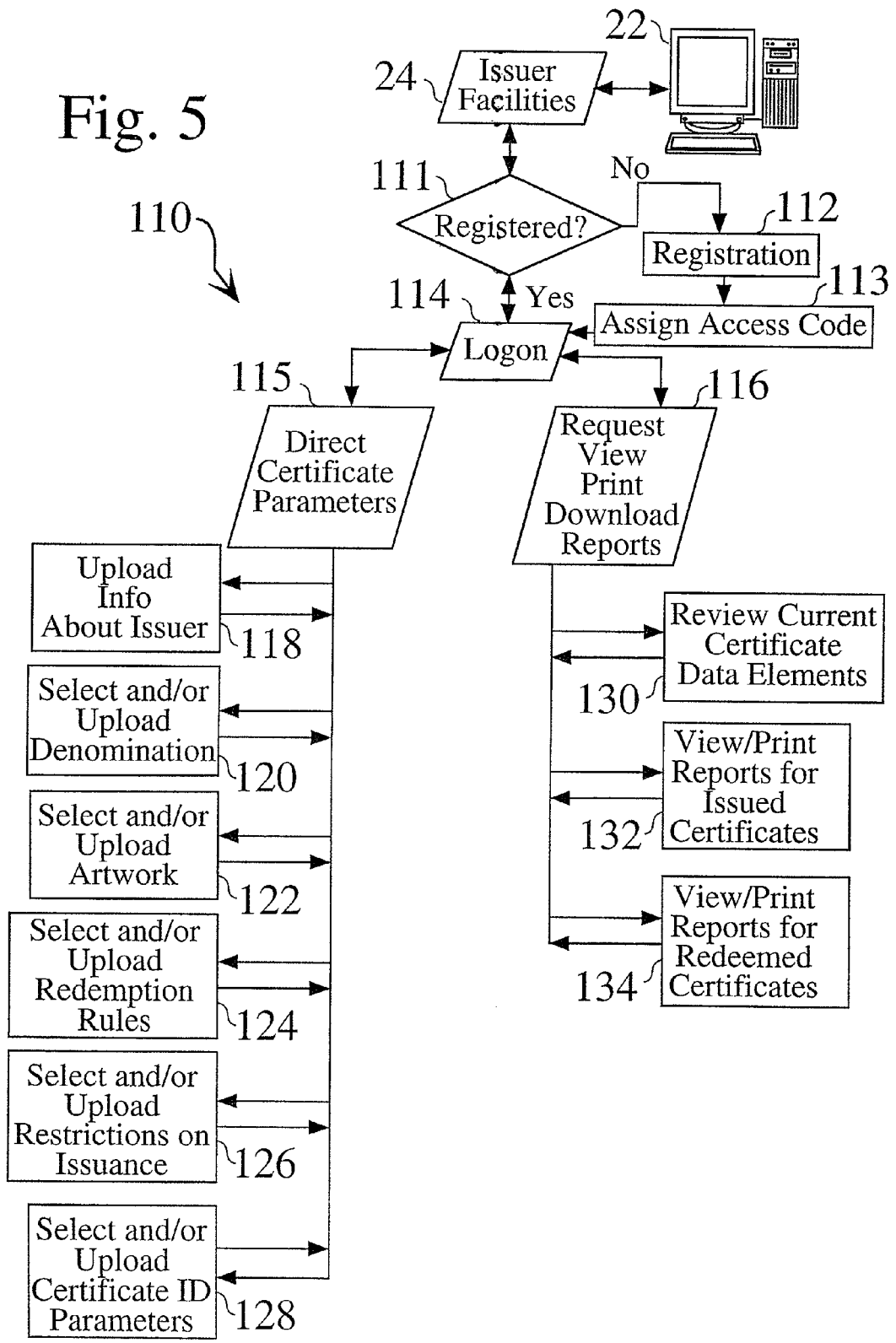
FIG. 5 is a schematic block diagram of issuer facility options.

Virtual Certificate Creation Options. FIG. 5 is a schematic block diagram 100 of issuer facility options, which includes initial registration of new issuers 112, secure entry 114 into the transaction network 10, an issuer certificate parameter module, and an issuer report module 116.

Registration of Issuers. An issuer ISR who is not previously registered as a client with the certificate authority 12 is preferably guided through a registration process 112, during which the issuer user is required to input relevant information (e.g. such as the name of the issuer user, the business name, one or more redemption locations RL, as well as relevant banking information). The preferred registration of issuers allows the certificate authority 12 to confirm that the issuer is a legitimate entity (i.e. such as an existing, valid business), and that the issuer is offering real goods and services. As well, the preferred registration process 112 includes the input of banking information related to issuers, such that funds may be properly transferred to issuers, from acquirers, such as when an acquired certificate 60 is redeemed at a redemption location RL.

The registration process 112 also typically includes a registration validation step, by which the certificate authority 12 or other independent entity checks pertinent registration information, such as bank account information, credit references, or merchant identification number. Based upon a successful registration step 112 and validation step, the certificate authority 12 preferably assigns an access number 113 to the new issuer, and sends the a registration notification and access number to the new issuer (e.g. such as by an e-mail notification). In an alternate embodiment, a new issuer ISR, having submitted a valid merchant number at registration step 112, may automatically gain an access number and subsequent access to the certificate authority.

Issuer Access. When an issuer is properly registered with the certificate authority 12, the issuer user ISR may gain ongoing access to the certificate authority 12. A registered issuer user ISR typically inputs the previously established unique issuer access code 113, to log 114 onto the certificate authority 12.

Creation of Certificate Parameters. An issuer user ISR at an issuer terminal 22, in secure communication with the certificate authority 12 (e.g. such as through initial registration 112 or a subsequent log on process 114), by means of issuer facilities 24 (e.g. such as through a web portal), can direct a large variety of certificate parameters 115. While an issuer user ISR may direct the creation of virtual certificates 60 through the selection of standard certificate elements 62-70, the issuer user ISR may optionally upload discrete data elements 62-70 to the certificate authority 12, which are unique to the issuer ISR, for storage as stored elements associated with one or more virtual certificates 60, or may otherwise direct certificate parameters, at step 115, by selection of options offered by the certificate authority 12.

At issuer information selection step 118, the issuer preferably selects or uploads issuer information 118, such as company information, or promotional information. Issuer information 118 may be preferably included within a virtual certificate 60, or may be included as information at a network site offering selection of the appropriate certificate 60. For example, a web page which includes a selectable certificate for a business typically includes other issuer information 118 to describe the business, or to describe the selectable commodity, such as a product or service description.

At denomination selection step 120, the issuer preferably selects or uploads denomination parameters for a virtual certificate 60. The denomination 78 may be in the form of a currency denomination, or in the form of a code associated with a product, a service, a coupon, a voucher, or other instrument for which the an acquired certificate 60 may be redeemed. The issuer may preferably authorize 120 the certificate authority 12 to issue certificates 60 within a set range of selectable denomination, or authorize the creation of virtual certificates 60 with a value determined by an acquirer user ACQ.

Examples of virtual certificates 60 that can be offered to acquirers by the certificate authority 12 on behalf of issuers include certificates denominated as full payment in exchange for an item and/or service (e.g. such as a gift certificate which is redeemable for an item and/or service, or a ticket or coupon voucher redeemable for an actual ticket), certificates 60 which may be redeemed as partial payment for a particular item or service, denominated as a currency amount (e.g. such as a gift certificate denominated in a currency amount); or a certificate 60 redeemable for currency, denominated in a currency amount (e.g. such as a "traveler's check").

At issuer artwork selection step 122, the issuer preferably selects or uploads artwork graphics 62a-62n which may be unique to the issuer (e.g. such as logos, trademarks, or other artwork, such as borders, illustrations, or photographs). The artwork graphics 62a-62n to be uploaded are typically uploaded in the form of graphics files 62a-62n (FIG. 2) (e.g. such as in TIFF, PICT or EPSF file formats), which are associated with an issuer ISR, a redemption location RL, a product or service, or basic certificate artwork 62.

At redemption rule information selection step 124, the issuer preferably selects or uploads redemption rules 66, such as an expiration date, any exclusion of redemption on the basis of geographic location, or other redemption rules 66 unique to the issuer. As seen in FIG. 2, redemption rule information 66 may be included as printed information on an acquired certificate 60.

At issuance restriction information selection step 126, the issuer preferably selects or uploads issuance restrictions to the certificate authority 12, such as to limit the number of acquired certificates 60a-60n to be issued by the certificate authority 12 on behalf of the issuer 22, such as within a specified time frame, within a geographic region, or on the basis if other criteria unique to the issuer.

At issuance certificate identification parameter selection step 128, the issuer preferably selects or specifies the format of unique certificate public key identification 82 (FIGS. 3,4). For example, the issuer may require unique certificate public key identification 82 which corresponds to existing product codes, inventory, or existing issuer certificate systems. Therefore, the issuer may optionally select, enter or upload certificate identification public key parameters 82, to be combined with certificate identification public key information 82 (FIG. 3) assigned by the certificate authority 12.

Issuer Reports. If an issuer user ISR has already created certificates 60, the issuer user ISR, through the report interface 116, can view, print, or download reports based upon previously created virtual certificates 60, acquired certificates, or for redeemed certificates 60. An issuer user ISR, at an issuer computer 22, is preferably provided with report options 116 to request, view, print, or download, in near real time, various reports relating to certificate parameters, issuance, redemption, and other information.

For example, at certificate review step 130, an issuer may preferably review existing parameters and data elements associated with a virtual certificate 60 or a series of virtual certificates 60a-60n. At issued certificate review step 132, an issuer may preferably review, print, or download information regarding issued certificates. At redeemed certificate review step 134, an issuer may preferably review information regarding certificates 60 which have been redeemed and/or revoked (*Steps 134,136, corresponding to steps 5-13,5-14 in original drawings, appear to be the same. Is there a correction that should be made here?*).

Figure 6:
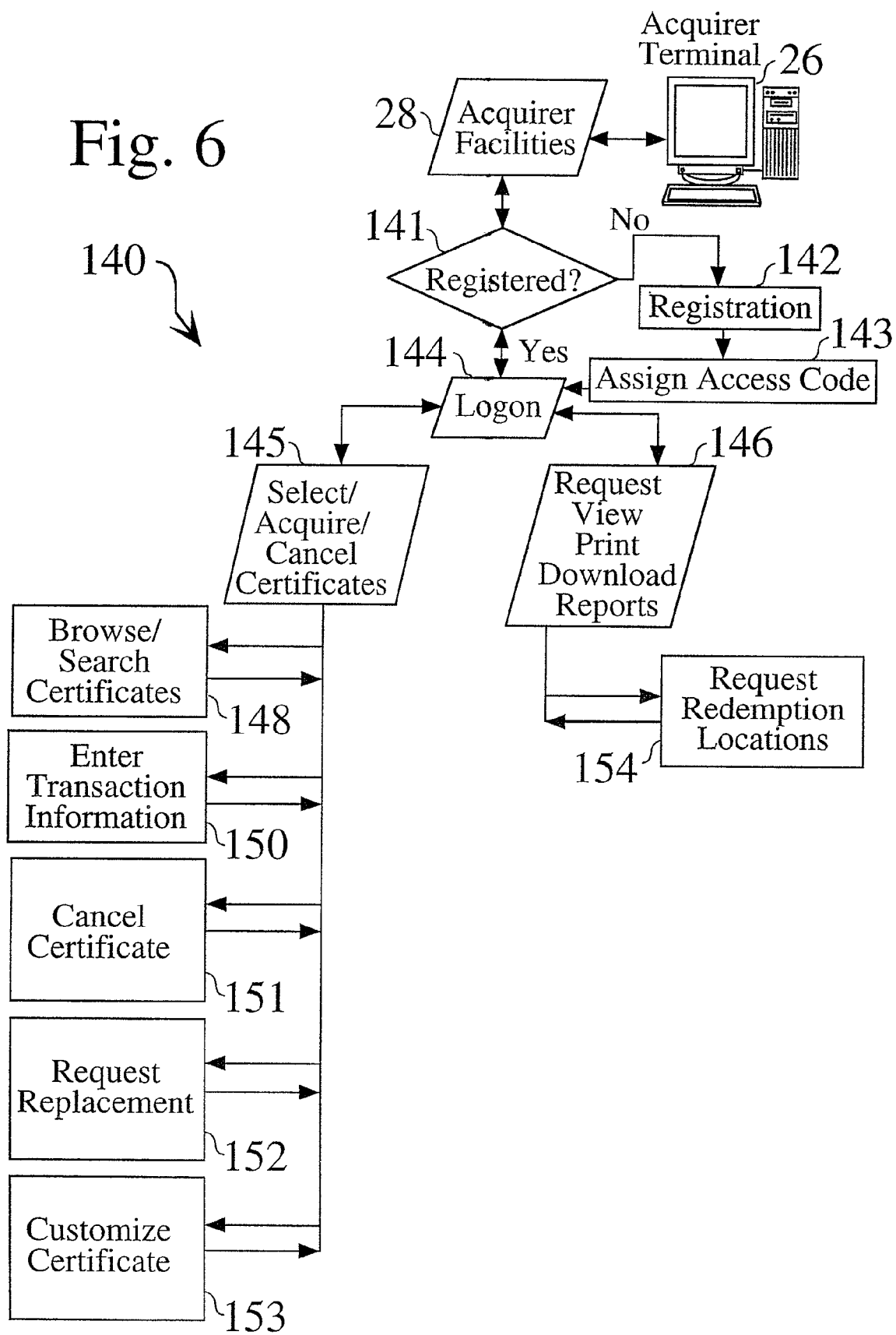
FIG. 6 is a schematic block diagram of acquirer facility options.

Acquirer Options. FIG. 6 is a schematic block diagram 140 of acquirer facility options. An acquirer user ACQ at an acquirer terminal 26, through acquirer, facilities 28, in a secure communication with the certificate authority 12, such as through a registration or logon step 142, is preferably provided with certificate acquisition options 144, such as the means to browse through or search 148 for virtual certificates 60 (to be assembled from the discrete elements) stored on the database 18 by a certificate authority 12, and to direct various parameters 144 regarding issuance of one or more certificates 60. For a virtual certificate which an acquirer user ACQ proceeds to acquire, the acquirer user ACQ enters transaction information at transaction step 150.

For previously acquired certificates 60 which have not been redeemed, the acquirer may preferably be able to cancel the certificate 60, at cancellation step 151. As well, for previously acquired certificates 60 which have not been redeemed, the acquirer user may preferably request a replacement for a certificate (e.g. such as for a lost or destroyed certificate). At customization step 153, the acquirer user ACQ may preferably be given customization choices, such as integrating an acquired certificate 60 within a printed card, or modifying the artwork to display other information (e.g. such as the name of an alternate recipient RCP). In addition, for previously acquired certificates 60 which have not been redeemed, an acquirer user ACQ may access reports, at step 146, regarding acquired certificates. For example, at redemption location report step 154, an acquirer user may view, print, or download a list of alternate redemption locations RL, or supplementary information regarding the redemption locations RL (e.g. such as a map), for an acquired certificate 60.

Figure 7:
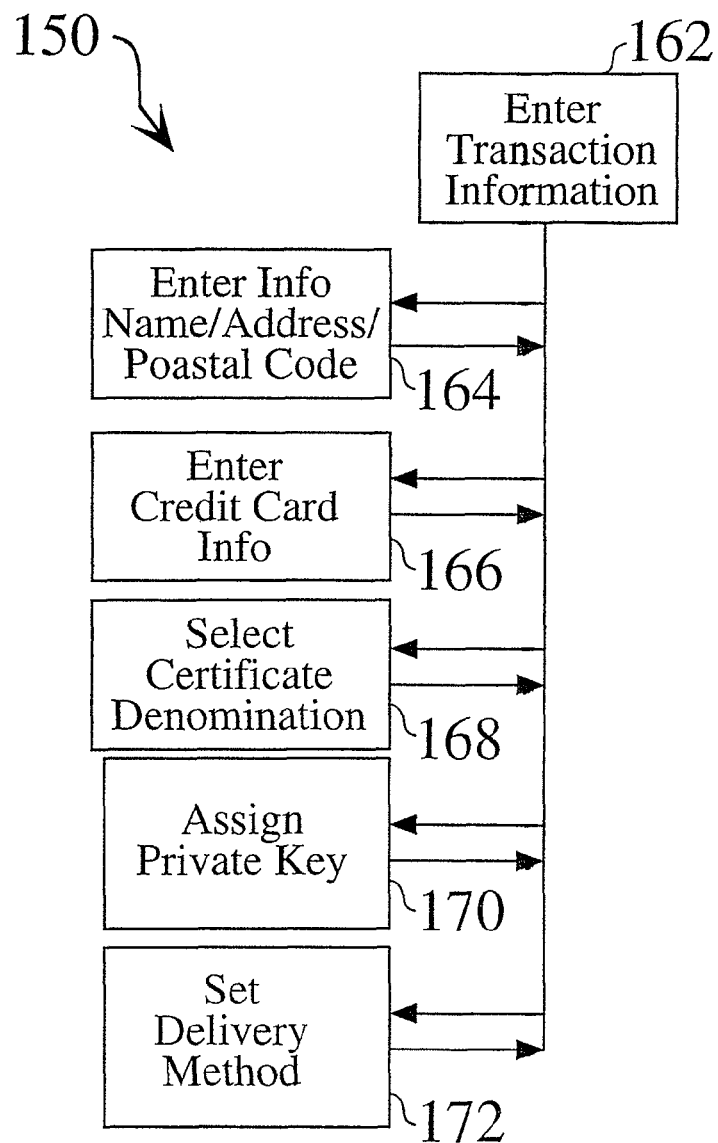
FIG. 7 is a schematic block diagram of transaction information data entry.

Certificate Acquisition and Input of Acquirer Information. FIG. 7 shows a detailed acquisition transaction process 150, by which an acquirer user may direct a certificate authority 12 to issue one or more selected certificates 60a-60n from an inventory of available virtual certificates 60. An acquirer typically receives an issued certificate 60, in exchange for an authorization to charge the acquirer upon certificate redemption, for payment at the time of acquisition, or on the basis of other acquirer qualifications. An acquirer may upload other necessary instructions and transaction information 162 to the certificate authority 12, which are then stored (e.g. such as in database 18) as additional independent elements associated with the issued certificate 60. Acquirer entered transaction information 162 typically includes name and address information 164, credit card or other information 166 associated with the acquirer's payment agent 52, assignment 170 by the acquirer of the secret private key 76 (FIG. 3) to be associated with the selected certificate 60, and a selected delivery method 172 for the certificate 60.

The acquirer is typically prompted (e.g. such as by a required data entry field or a dialog box) to input the private key 76 (e.g. such as a personal identification number (PIN) into the system. The acquirer is preferably prompted to enter the private key 76 twice, to verify that the acquirer user has correctly entered a known private key), to be stored in association with the certificate 60. In a preferred embodiment of the certificate system 10, an acquirer may specify that the private key 76 to be associated with an issued certificate 60 be comprised of other identification information associated with the transaction, such as an account number which associates the acquirer with the acquirer's payment agent 52 (e.g. a credit card number), or a debit card number. As well, an acquirer user ACQ may preferably select and/or specify a denomination 168 for an acquired certificate 60 (e.g. such as a currency amount), typically by selecting from among denominations presented by an issuer. In a preferred embodiment of the certificate system 10, the certificate authority 12 sends a confirming e-mail to the acquirer.

When the acquisition of a certificate 60 is complete, the certificate authority 12 preferably allows the acquirer to preview of a printed version of the certificate 60, and typically presents certificate delivery options 172 to the acquirer, such as the transfer of a downloadable PDF file to the acquirer terminal 26, the e-mail of certificate information 98 to the acquirer terminal 26 (or to an alternate recipient RCP), the facsimile transmission 32 of a certificate, an electronic encoding 34 of a smart-card based certificate, or the electronic transfer of the certificate to a redeemer computer 36 at a desired redemption location RL.

The acquirer can send an e-mail or other message to a recipient (e.g. such as for a gift certificate), directing the recipient to log on and pick up the certificate, either for printing, such as at the recipient's computer, at the redemption location RL, or at a third party (e.g. such as at a third party mail service provider). If no hard-copy of the acquired certificate 60 is desired, or if printing is not feasible, the certificate information can be transferred directly to the issuer merchant's computer (e.g. a paperless electronic certificate), by which the acquirer ACQ or alternate recipient RCP need only to visit a redemption location RL, and supply the private key PIN number to the redemption clerk RC.

Examples of alternate delivery methods for an acquired certificate 60 which may be specified by an acquirer ACQ include downloading of the certificate 60 as an electronic file (e.g. such as within a portable document format (PDF) file (by ACROBAT™, of Adobe Systems, Inc., of San Jose Calif.), or as an electronic description transferred via the acquirer's computer 26 to a transaction card encoder 34, or for printing on a printer 30 connected to the acquirer's computer 26, or for subsequent printing later by the acquirer user.

A redeemer (i.e. a store clerk) typically needs only the certificate information 74 (which includes the denomination 78 of the certificate 60 and public keys 80,82), in combination with the acquirer's private key 76, to validate an acquired certificate 60. Hence, an issuer may request that a certificate 60 be delivered in the form of an e-mail, containing only these items, or as encodeable "smart card" data that can be magnetically stored by the acquirer using a "smart card" encoder-34 attached to the acquirer computer 26 or other communication device.

An alternate preferred delivery option 172 which an acquirer may specify is that an acquired certificate be printed by the certificate authority 12, and delivered by a postal service or other delivery service, to an address specified by the acquirer user ACQ (the typically the address of the acquirer ACQ, or the address of an alternate recipient RCP, such as if the acquired certificate 60 is intended as a gift certificate).

An alternate preferred delivery option 172 which an acquirer may specify is that an image (e.g. such as a TIFF file) of an acquired certificate 60 be faxed by the certificate authority 12, to a facsimile (fax) machine designated by the acquirer user ACQ (typically a facsimile machine 32 associated with the acquirer ACQ, or a fax machine 32 associated with an alternate recipient RCP).

As seen in FIG. 6, until an acquired certificate is redeemed, an acquirer preferably has the ability to cancel 152 a previously acquired certificate 60, or to request that an acquired certificate be revoked and replaced 153 by a new certificate 60. For example, if an acquirer user accidentally damages, destroys, or loses a previously printed acquired certificate 60, the acquirer may simply print out a new certificate 60, or have a new certificate delivered or faxed, and may either retain the previously stored private key 76, or may specify a new private key 76.

Since an acquired certificate 60 may only be used for redemption once (at which time further use is revoked), there is no financial risk to the issuer ISR in the use of replacement certificates. As well, even if a certificate is lost and retrieved by a second party, or is stolen, the lost acquired certificate is unredeemable, without submittal of the private key 76, which is not included as printed information on a certificate 60.

As shown in FIG. 6, an acquirer is preferably allowed to query the secure database 18 for available redemption locations 154 for an acquired certificate 60, typically on the basis of a geographic screening. The acquirer may request redemption locations 154 when the certificate is acquired, and is preferably provided with ongoing access to redemption locations 154 (such as if an alternate redemption location is desired, and is allowed by the redemption rules 66 for an acquired certificate 60.

Prior to acquisition, the virtual certificate is 60 merely a defined product or service, associated with an authorization to produce a certificate, as defined by an issuer, for the defined product or service. However, after the acquisition transaction is completed, the certificate 60 then exists as an established entity within the database 18, thereby becoming a token which directly corresponds to the corresponding defined product or service, which is to be surrendered by the seller to the holder of the certificate 60 at the time of a completed redemption transaction 104.

In addition to the previously defined public keys 80,82 and private key identifiers, upon issuance of an acquired certificate, the certificate authority 12 preferably creates or assigns a unique issued certificate number (e.g. such as certificate "XYZ-203-4067") which corresponds to the acquired certificate 60, as well as to the collection of the defined elements of the certificate 60 (e.g. such as the associated graphics 62, redemption rules 66, and denomination 78), which are bound within the database 18 after the acquisition transaction.

In a preferred embodiment, the certificate authority 12 communicates the acquisition transaction 72 to the issuer (e.g. such as through issued certificate reports 132), such that the product or service which is to be received upon redemption may be held (i.e. reserved). For a product within an inventory at a redemption location, the product may preferably be placed on hold. For a designated service, the issuer may preferably use the acquisition information to schedule personnel or equipment, or to limit the further sale of goods or services (e.g. such as for an airline flight, which has a limited number of seats available for a scheduled flight and time).

Before the acquisition transaction 72, the virtual certificate 60 is merely an authorization to construct a certificate 60, wherein the virtual certificate 60 is typically stored as a product or service category within a virtual inventory of other virtual certificates. If a certificate is never acquired, there is no effect upon a real inventory. If an inventory of real goods an services (or associated cost structures) change for an issuer, they may simply reaccess the certificate system 10, and remove or edit previously defined virtual certificates 60, or create other certificates 60 which reflect their current goods, services, or cost structures.

For example, for an issuer/merchant who has a limited number of products available (e.g. such as three mission-style coffee tables), the issuer ISR would preferably limit the availability of virtual certificates 60, as a redemption rule 66 at issuer facility step 124 (FIG. 5). If an acquirer user ACQ acquires a certificate for such a commodity having a limited availability, the certificate authority 12 preferably limits the acquisition to the defined virtual inventory. As well, for an issuer ISR which creates virtual certificates 60 for a plurality of redemption locations RL, the issuer may preferably create virtual certificates 60 which are unique to one or more of the redemption locations. For example, a first redemption location RL may sell products which are not available at a second similar redemption location RL, or the selling price for a product may be different at different redemption locations. For virtual certificates 60 which are defined as virtual coupons (e.g. such as for a discount at a redemption location RL), an issuer can preferably define different discount rates for different redemption locations RL.

Figure 8:
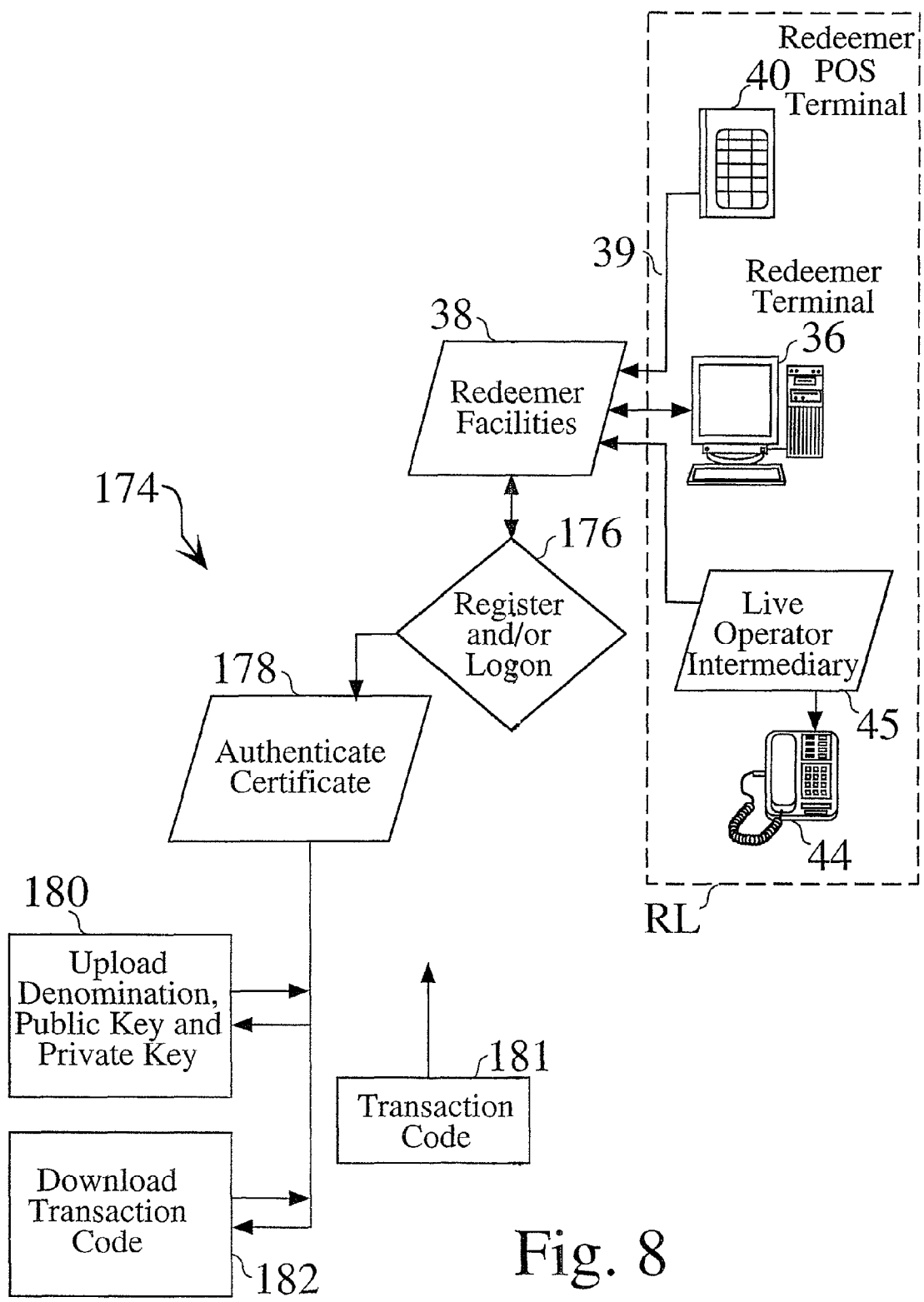
FIG. 8 is a schematic block diagram of redeemer facility options.

Certificate Redemption. FIG. 8 is a detailed schematic block diagram 174 of redeemer facility options. A redemption clerk RC (e.g. such as a sales clerk at a redemption location), establishes electronic communication with a certificate authority 12 through redeemer facilities 38. As seen in FIG. 1, the redeemer facilities 38 are typically accessed through a redeemer computer terminal 36, a redeemer POS terminal 40, or by a telephone 44 (either by using a keypad driven menu, or through a live operator intermediary 14).

When an acquirer user ACQ (or alternate recipient RCP) desires to proceed with a redemption transaction 90 at a redemption location, the acquirer user ACQ typically hands the printed certificate 60 to a redemption clerk RC, and communicates the private key 76. The redemption clerk RC then validates the issued certificate 60, to obtain a redemption authorization code 181 from a certificate authority 12 to redeem the certificate 60, thereby performing a certificate authentication 178. In a preferred embodiment of the certificate system, the acquired certificate includes redemption instructions 66 (i.e. terms of service instructions), which a redemption clerk RC preferably follows to redeem the acquired certificate 60. The redemption clerk RC uploads 180 certificate information 98 to the certificate authority 12, which typically includes the certificate denomination 78, the public keys 80,82, as well as the private key 76 (which is submitted separately by the acquirer user ACQ).

In a preferred embodiment of the certificate system 10, communication of redemption information 98 (e.g. such as communication of the required public keys 80,82, private key 76 and denomination 78) of the certificate 60 to the certificate authority 12 is made by an electronic link 39 with a point-of-sale (POS) terminal 40 and/or a card code scanner 40, a redeemer computer 36, or by other means having the ability to establish an electronic link 39 with the certificate authority 12. For example, a redemption clerk RC preferably uses a bar code image scanner or other POS terminal 40 to determine the redemption information 98, while the acquirer ACQ typically enters the private key 76 (e.g. such as a PIN number) into a keypad of a POS terminal 40.

In a redemption system 174 which comprises a telephone terminal 44, the communication of the redemption information 98 of the certificate 60 to the certificate authority 12 may be made using a touch-tone telephone keypad on the telephone 44, or by live-phone contact to an operator intermediary 45 in communication with the certificate authority 12.

Authorization of Certificate Redemption. Upon authentication of the certificate by the certificate authority 12, on the basis of a correlation of the unique certificate identification 74 in combination with the acquirer's private key PIN 76 with the transaction records associated with the certificate 60 stored in the secure database 18, the certificate authority 12 authorizes the redemption, and revokes the certificate 60.

In a preferred embodiment of the certificate system 10, upon authentication of a certificate 60, the certificate authority 12, creates a unique redemption transaction code 181, which through redeemer facilities 38 may be downloaded 182 or otherwise communicated to a redemption terminal 36,40, 44. The certificate authority 12 preferably stores the redemption transaction code 181 in association with the data elements relating to the certificate 60. The redemption transaction code 181 may subsequently be used by redeemer personnel RC, such as through a redemption terminal 36, to authenticate to the certificate authority 12 that the redemption of the certificate 60 occurred, in the event there are subsequent discrepancies in the final financial reconciliation of payment transfers associated with the redemption transaction 104.

The certificate authority 12 has the means 46 to selectively establish an electronic communication link 57 with an acquirer payment agent 52, to request payment, and transmits to the acquirer payment agent 52 the identification needed by the acquirer payment agent 52 to authenticate the acquirer user ACQ, and obtain approval for the redemption transaction 104.

Therefore, upon a successful redemption transaction 104, the certificate authority 12 typically manages the transfer of funds between appropriate payment agents. In one embodiment the certificate authority 12 sends instructions to the authority payment agent 58, to transfer funds to the redeemer payment agent 56 of a redeemer.

Figure 9:
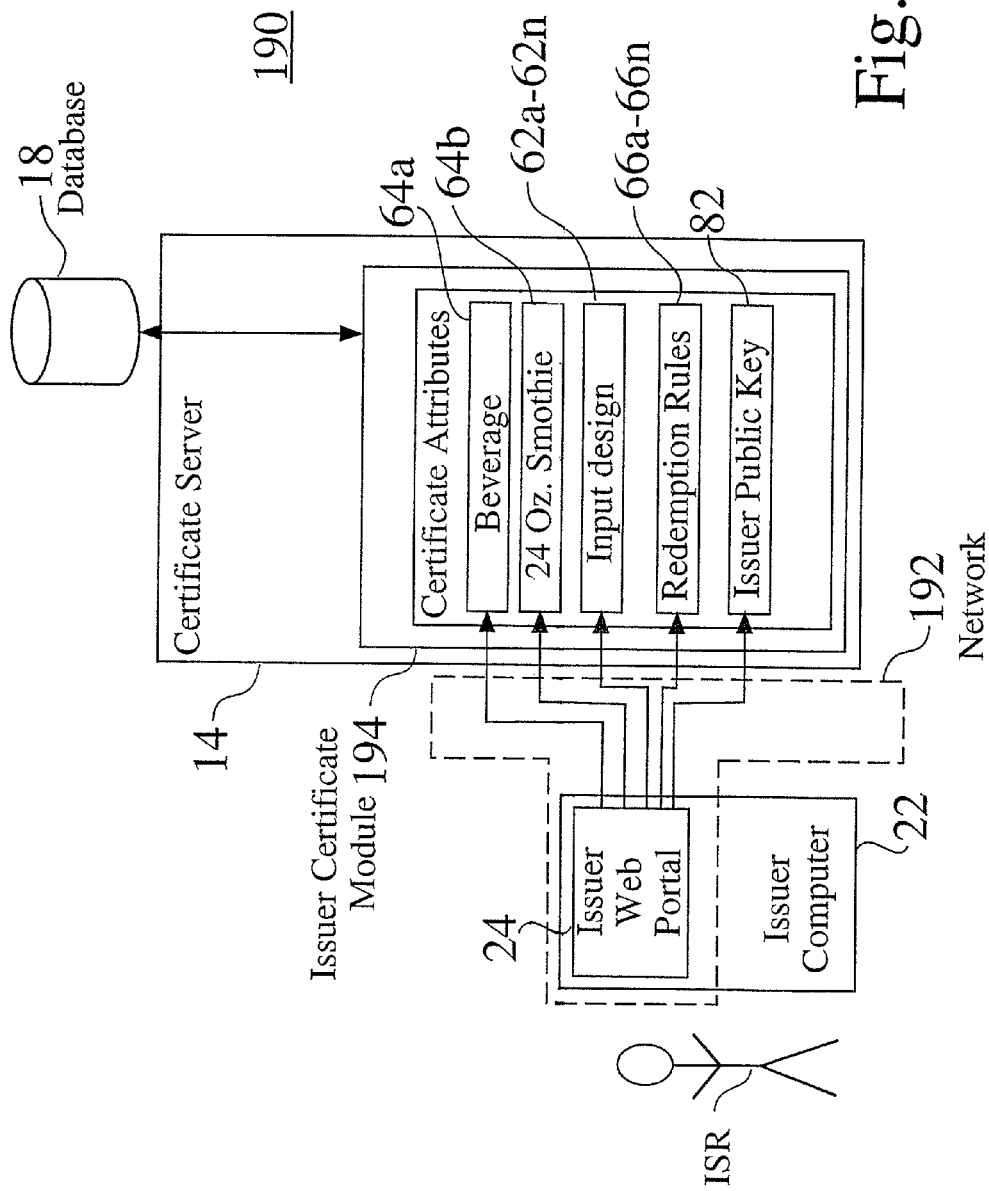
FIG. 9 shows the creation of virtual certificates by an issuer on at a certificate authority server.

Issuer Creation Module. FIG. 9 shows the creation of a virtual certificate 60 by an issuer user ISR at an issuer terminal, through issuer facilities 24. As described above, an issuer user ISR, in communication with the certificate authority 12 across a network 192 (e.g. such as the internet), typically through a certificate server 14, can direct the creation of one or more virtual certificates 60. The issuer facilities preferably include a issuer certificate creation module 194, in which the issuer may define attributes for a virtual certificate 60, such as denomination information 64a,64b, certificate design information 62a-62n, redemption rules 66a-66n, and issuer defined public key information 82.

Figure 10:
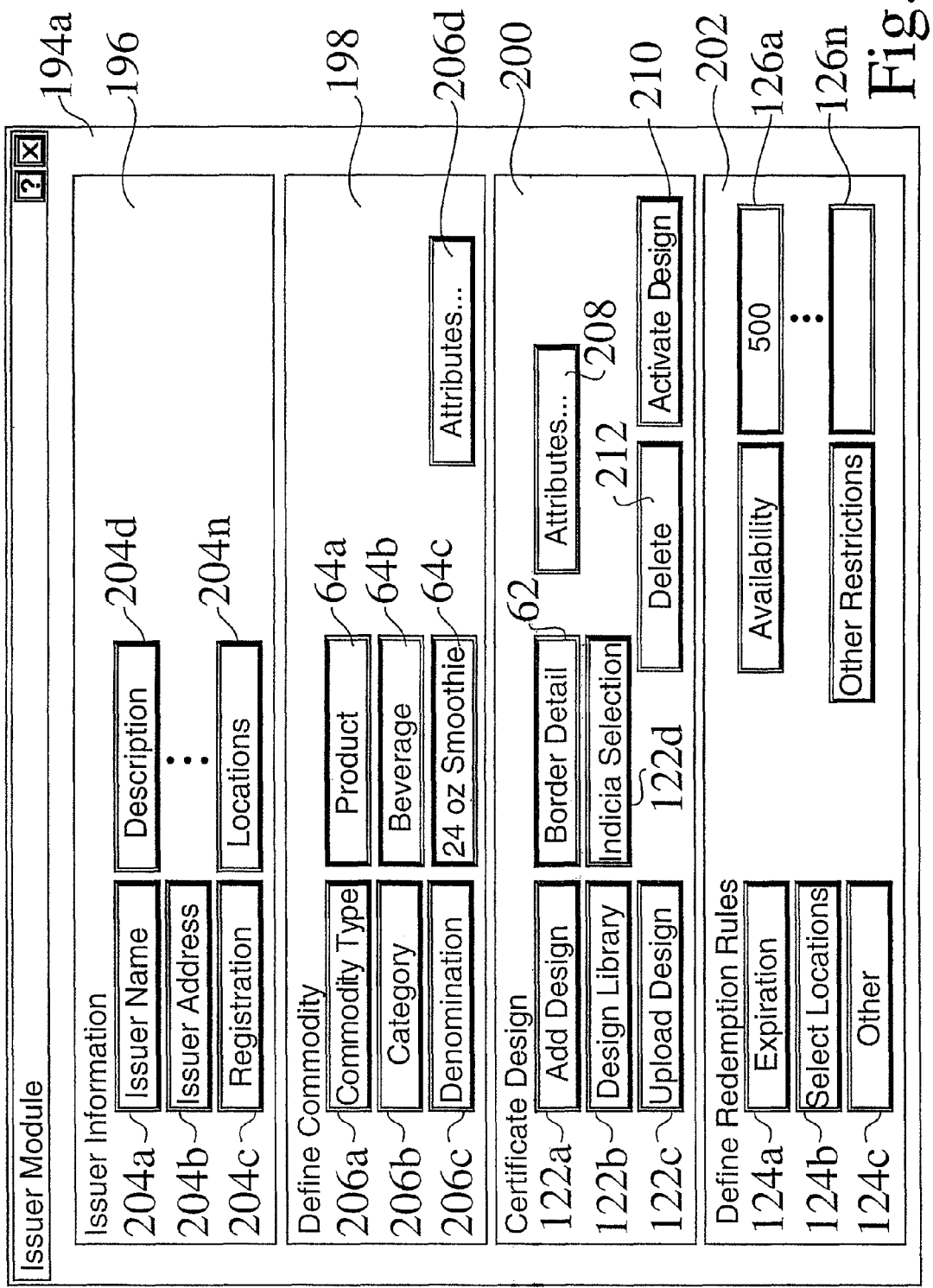
FIG. 10 shows an issuer virtual certificate creation module interface.

FIG. 10 shows an issuer virtual certificate creation module interface 194a, which preferably includes an issuer information module 196, an issuer commodity denomination module 198, an issuer design module 200, and a redemption rule module 202.

The information module 196 typically includes issuer business name 204a, issuer address 204b, registration information 204c, issuer description copy 204d, and a comprehensive list 204n of all associated redemption locations RL. The commodity denomination module 198 typically includes commodity type 206a, commodity category 206b, and a denomination descriptor 206c. Other denomination attributes may be set with denomination attribute control 206d. The issuer design module 200 typically includes selection of various design element 62, such as through add design element control 122a, design library control 122b, and upload design control 122c. Attributes for a design are preferably set by attribute control 208. A design element 62 is preferably activated by control 210. A design element 62 which is not needed may be deleted by deletion control 212. The redemption rule module 202 typically includes user selectable expiration limitations 124a, location selection 124b, or other redemption rules 124c. As well, other issuer entered restrictions may be entered, such as availability 126a, or other restrictions 126n.

Figure 11:
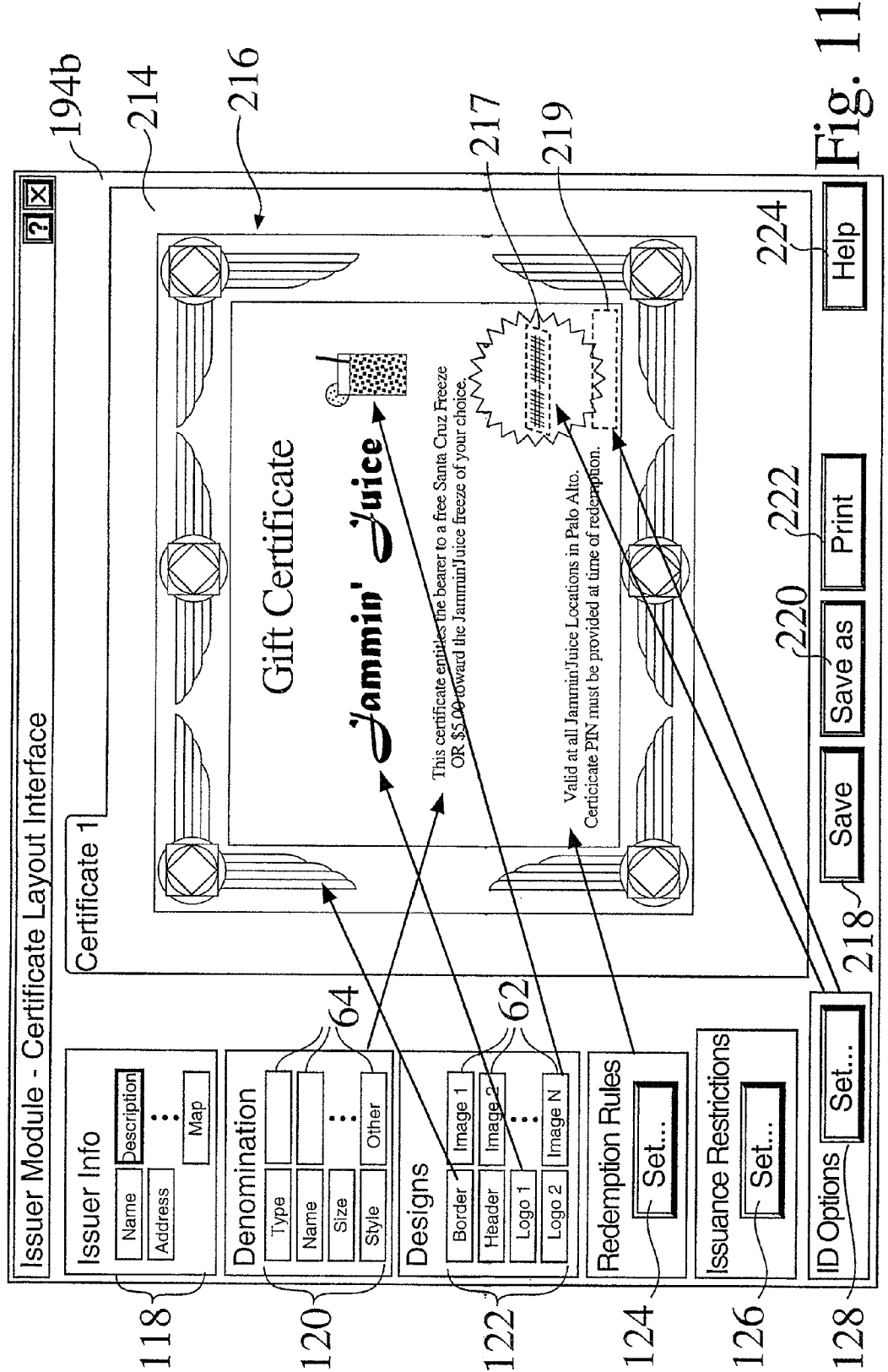
FIG. 11 shows a graphic user interface for an issuer virtual certificate creation module.

FIG. 11 shows a preferred graphic user certificate layout interface 194b for an issuer virtual certificate creation module 194. The certificate layout interface 194b preferably includes a work area 214, in which an issuer user ISR can establish a defined layout for virtual certificates 60, as they may appear on a network site, or as an acquired certificate 60 may look if a printable form is used. User selectable elements, such as denomination 64, design elements 62a-62n, redemption rules 66, or issuer defined certificate identification elements 82, preferably appear as selectable icons. The selectable elements are preferably established in the issuer virtual certificate creation module interface 194a, such that selectable elements are preferably limited to the defined attributes. The work area 214 preferably allows the issuer user ISR to create a certificate layout in a WYSIWYG work environment, wherein elements may be "dragged into position in the area, and wherein a certificate preview (e.g. such as a thumbnail or full size image) is created within the work area 214. An issuer user may save 218 a virtual certificate, rename 220 a certificate as a new certificate, print 222 a proof copy, or be guided 224 to context-sensitive help screens.

Creation of Inventory. FIG. 12 is a block diagram of a virtual inventory stored within a database 18. Each created virtual certificate 60 is a defined collection of elements, such as denomination elements 64a,64b, redemption rules 66, such as applicable redemption locations RL, and a public key identification packet 80,82. One or more virtual certificates 60, which are stored within the database 18, become a virtual inventory 228 of goods and services, which can then be accessed through one or more network locations (e.g. such as through web sites).

The virtual inventory 228 typically comprises a wide variety of goods and services. As well, the virtual inventory 228 typically comprises virtual certificates which may be redeemed within different geographic regions. For example, a first inventory subset 230a within the virtual inventory 228 may be a subset of similar products or services, but with no limitation of a redemption location RL. By contrast, a second inventory subset 230b within the virtual inventory 228 may be a subset of all products or services which may be acquired, but within a small geographic region.

Certificate elements, such as commodity type, denomination, product descriptors, and redemption locations RL are preferably searchable data elements, by which virtual certificates 60 for products or services may be quickly located.

One or more network sites, such as aggregate sites 234 (FIG. 13), may preferably be established, to allow an acquirer shopper ACQ to locate an appropriate subset 230 of virtual inventory 228, to allow for the sale of similar goods and services from a plurality of issuers ISR, and to allow the sale of goods and services to be redeemed within a given region. As well, from a site 234 having a subset 230 of any portion of the virtual inventory, the acquirer is preferably provided with search tools 238 by which appropriate virtual certificates 60 are located.

Figure 13:
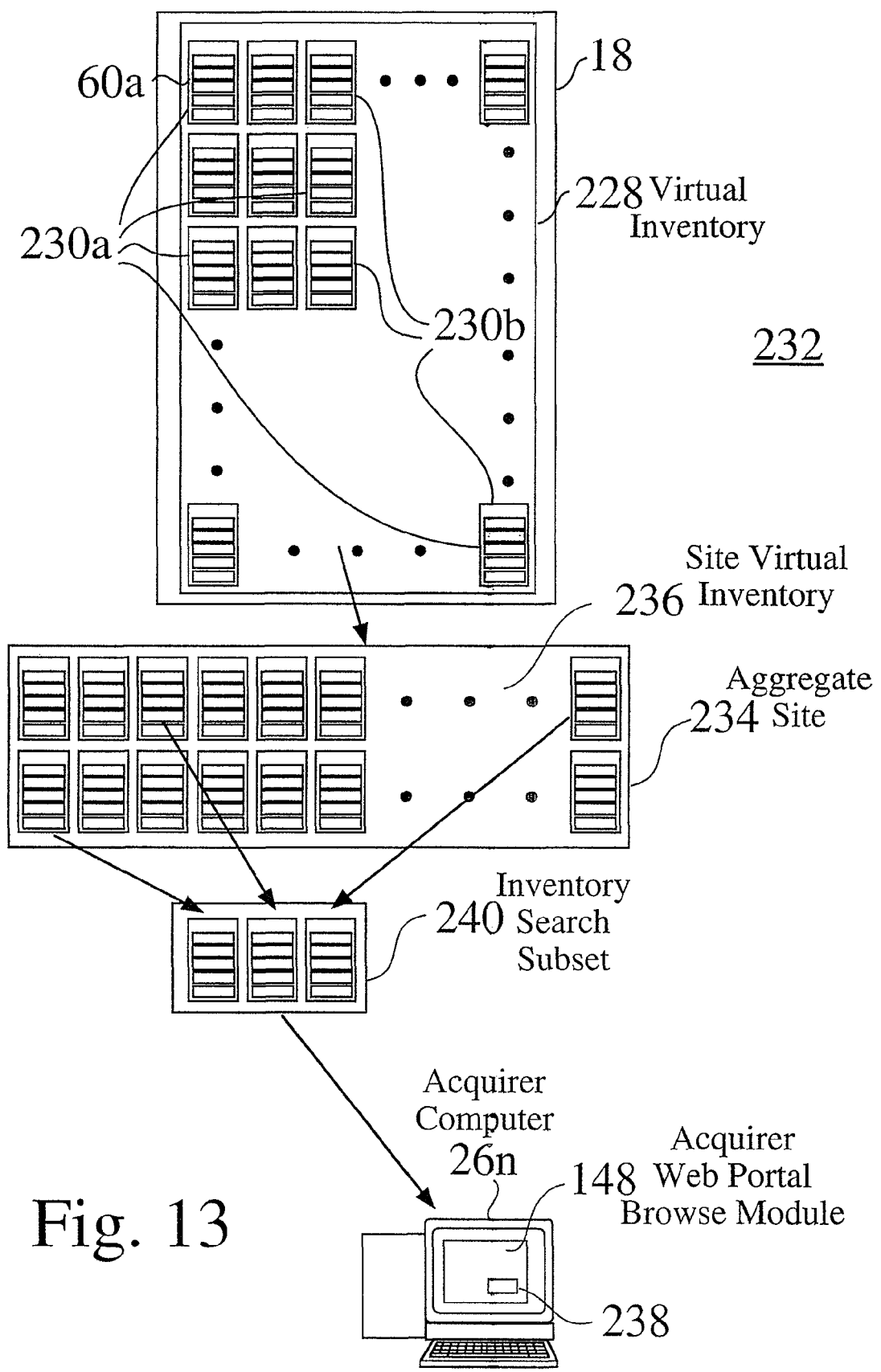
FIG. 13 is a block diagram showing a site virtual inventory at an aggregate network site, and a search subset of the site virtual inventory directed by a search command at an acquirer terminal.

FIG. 13 is a block diagram showing a site virtual inventory 236 at an aggregate network site 234, and a search subset 240 of the site virtual inventory 236 directed by a search command 238 within a browsing (i.e. shopping) module 148 at an acquirer terminal 26n.

In a preferred embodiment of the certificate system, an acquirer user ACQ is able to control (e.g. such as by search command 238) which of the available virtual certificates 60 are to be displayed, on the basis of a particular store or brand of product, or on the basis of certificate types and/or issuer types categorized by one or more descriptive criteria available in the discrete information associated with each unissued virtual certificate.

In a preferred embodiment of the certificate system 10, an acquirer user ACQ may specify a geographic location for a desired redemption location RL (e.g. such as a redemption within a postal code area or telephone area code region). The certificate authority 12 uses the selected geographic descriptor to create a subset 240 of available virtual certificates 60, such that only redeemable certificates associated with the specified geographic location are presented to the acquirer user ACQ. For example, an issuer ISR may have specified geographic exclusions for a certificate which correlate to the acquirer's geographic identification information, precluding redemption within the acquirer's geographic area.

Therefore, an acquirer user ACQ can locate redemption locations RL for one or more products or services which are available as selectable virtual certificates 60. Upon initiating a search, such as by product type, service type, zip code, town, or state, the certificate authority 12 preferably presents a browseable subset 240 of the entire virtual inventory 228 (or of an aggregate inventory 236), which matches search limiters entered by the acquirer user ACQ.

For example, an acquirer user in FIG. 13 may have entered "coffee" as a search descriptor at an aggregate site 234, within a zip code of "97213", with a selected local radius of 25 miles. The certificate authority 12 would then perform a search for product types or description text that includes the word "coffee", for virtual certificates 60 which include a one or more redemption locations within the "97213" zip code (as well, in this preferred embodiment, within a region roughly defined by a 25 mile radius from the center of the "97213" area code). In this manner, the acquirer user may be presented with a selection of virtual certificates 60 which match the search criteria.

Since the inventory 228 of virtual products and services is a virtual product inventory 228, one or more of the virtual products or services may be accessed by a plurality of network locations 234. For example, a virtual certificate 60 created by an issuer ISR who sells computers may correspond to the acquisition of a small, hand-held tape recorder. The corresponding virtual certificate 60 may advantageously listed within a plurality of aggregate sites 234 such as an aggregated site 234a for electronics, an aggregated site for business supplies 234b, an aggregated site for school supplies 234c, or even a site for gadgets or gifts 234d.

From an aggregated web site 234, which offers virtual certificates 60 for goods or services from a plurality of businesses ISR, RL, an acquirer user ACQ, searching or browsing through an aggregate inventory 236 of virtual certificates 60, is preferably guided to web pages or sections of web pages 248 (FIG. 14), which describe one or more certificates 60, along with a presentation of other information 252a,252b which was input by the user to be displayed with the virtual certificate 60 (e.g. such as a store or product logo, a description of the store, business address, phone number, or map, or a description of the product or service represented by the virtual coupon 60). As well, links to related virtual coupons for other products and services from the same issuer are preferably included.

Figure 14:
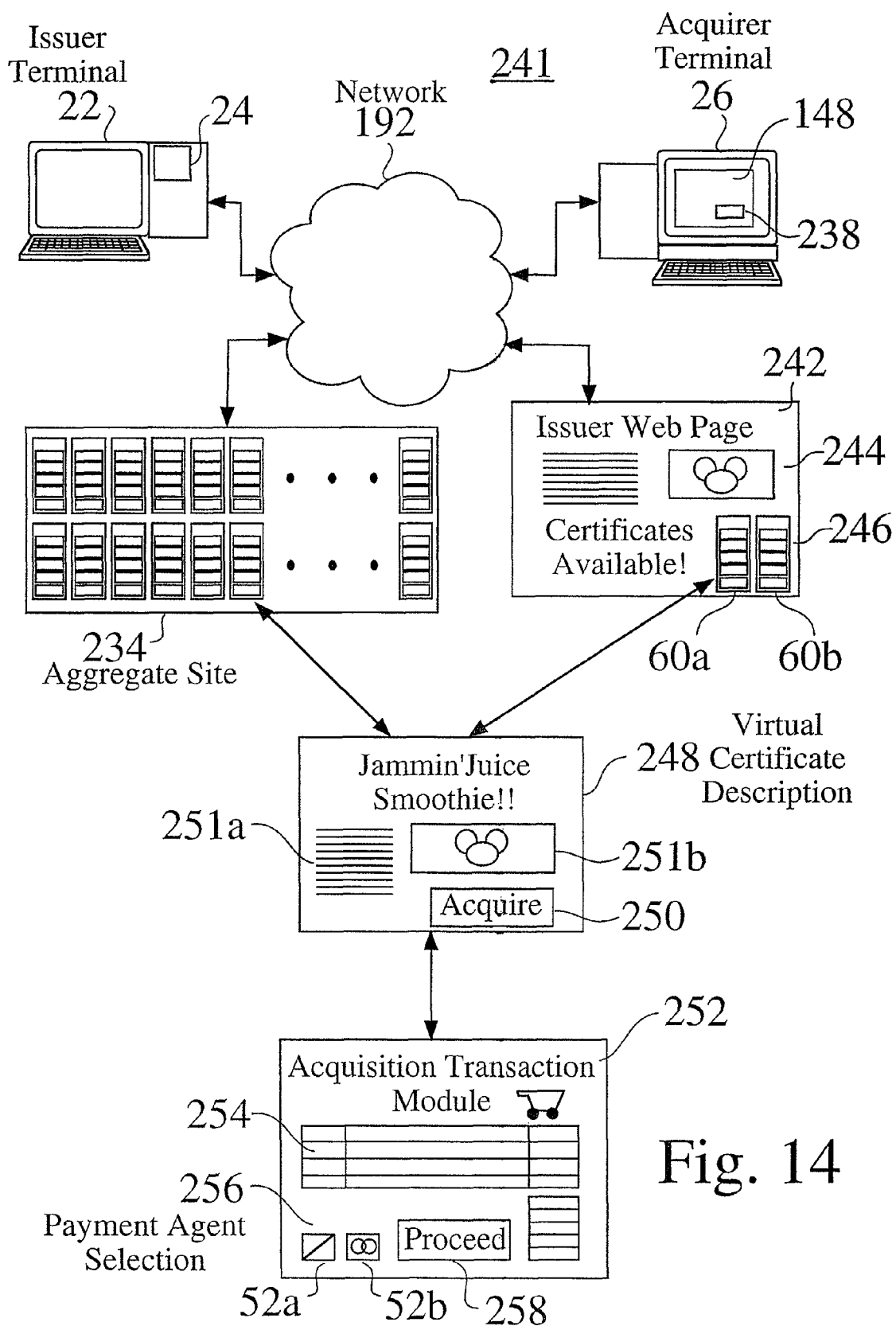
FIG. 14 is a block diagram of an acquisition transaction module at an acquirer terminal, which is accessible from a selection of a virtual certificate from one or more alternate sites.

As well, the same certificate 60 may be accessed from the issuer/merchant's own network site 242, which has a site virtual inventory 236 limited to virtual certificates 60 that are created by the issuer ISR. For example, a merchant site 242 (i.e. such as an issuer/redeemer site) that is established by a merchant may include a wide variety of information 244, typically related to the issuer ISR or associated redemption locations RL. Within the merchant site 242, the issuer ISR may preferably provide direct access to virtual certificates, such as through selectable certificate icons 246 (FIG. 14).

Upon selection of a selectable certificate locator icon 246, an abbreviated certificate description page 248 is typically presented to the acquirer user ACQ at the acquirer terminal 26, which describes the goods and services for the selected virtual certificate. The certificate description page 248 provides a virtual "shelf space", which may be accessed from one or more aggregate sites 234, or from a merchant web site 242. The certificate description page 248 typically provide issuer defined options, such as headers, product or service description, including selectable options to view and acquire 250 coupons or certificates.

An acquirer user ACQ therefore may preferably access the inventory 228,236 of virtual certificates 60 through both one or more larger aggregated sites 234, as well as through existing merchant sites 242. An acquirer customer ACQ typically finds a virtual certificate 60, or does a search to find various network sites offering virtual certificates 60 for desired goods or services.

Acquisition Transaction Module. FIG. 14 is a block diagram 240 of acquirer access to an acquisition transaction module 252, wherein the acquisition transaction module 252 is accessible through one or more aggregated sites 234, as well as through an existing merchant site 242.

Selection of a selectable acquisition icon 250 by an acquirer user ACQ typically transfers the acquirer user ACQ to a acquisition transaction module 252 within the acquirer facilities 28 for the certificate system 10. While the acquisition transaction module 252 is operated within the certificate system 10, the description of the selected available product or service, the denomination 64 for the selected available product or service, as well as other redemption rules 66, are determined by the issuer options 114 (FIG. 5). As well, limitations on appropriate acquirer payment agents 52 are initially selectable 252 by the issuer, and limit the payment agent choices within the shopping transaction module 252.

For example, if a redemption location RL for an issuer ISR accepts VISA™ or AMERICAN EXPRESS™ credit card payment agents 52, but does not accept MASTERCARD™ credit card payment agents 52, the issuer ISR preferably limits the selectable 256 payment agents 52, to be displayed and selectable within the shopping transaction module 252, to VISA™ or AMERICAN EXPRESS™ payment agents 52.

While the shopping transaction module 252 is typically used for a single acquisition transaction 90, related to a single issuer ISR, the shopping transaction module 252 can alternately be used to acquire one or more certificates related to the same issuer ISR, for a single redemption location RL. Details of the acquisition transaction are displayed within the transaction invoice 254.

As described above, during an acquisition transaction 72, the acquirer facilities 28 typically prompt the acquirer user to enter required transaction information 150 (FIG. 5), which include the submittal of a private key 76, which is thereafter associated with the acquired certificate 60.

Alternate Embodiments for Payment Transfer. The certificate system 60 is easily adapted to provide alternate systems for payment transfer. For example, as described below, funds may be transferred directly from an acquirer payment agent 52 and a redeemer payment agent 56 upon the acquisition of a certificate 60, which is redeemed at a later time at a redemption location RL.

As well, funds may first be transferred directly from an acquirer payment agent 52 to a third party (e.g. such as the certificate payment agent 58) upon the acquisition of a certificate 60, and from the certificate payment agent 58 to the redeemer payment agent 56 upon redemption.

In an alternate embodiment, an independent entity operates the certificate system 10, purchases virtual certificates 60 from one or more issuers 22, and then sells the purchased virtual certificates to acquirers, with funds transferring between the acquirer payment agents 52 to the certificate payment agent 58, either during the acquisition transaction, or during the redemption transaction 104.

Certificate Systems Having Payment Upon Acquisition. In one embodiment of the certificate system 10, payment funds are transferred from the acquirer payment agent 52 when a certificate 60 is acquired. While this payment system may not be applicable for all embodiments of the certificate system 10, payment of funds at the point of certificate acquisition 72 is often beneficial for issuers and redeemers, wherein inventory of goods, or reservations of services, are preferably held or reserved upon payment.

As well, for issuers, such as larger corporate clients, which are linked to a plurality of redemption locations RL (e.g. such as a chain of retail stores), inventory related to acquired certificates may be routed to a particular redemption location RL.

Figure 16:
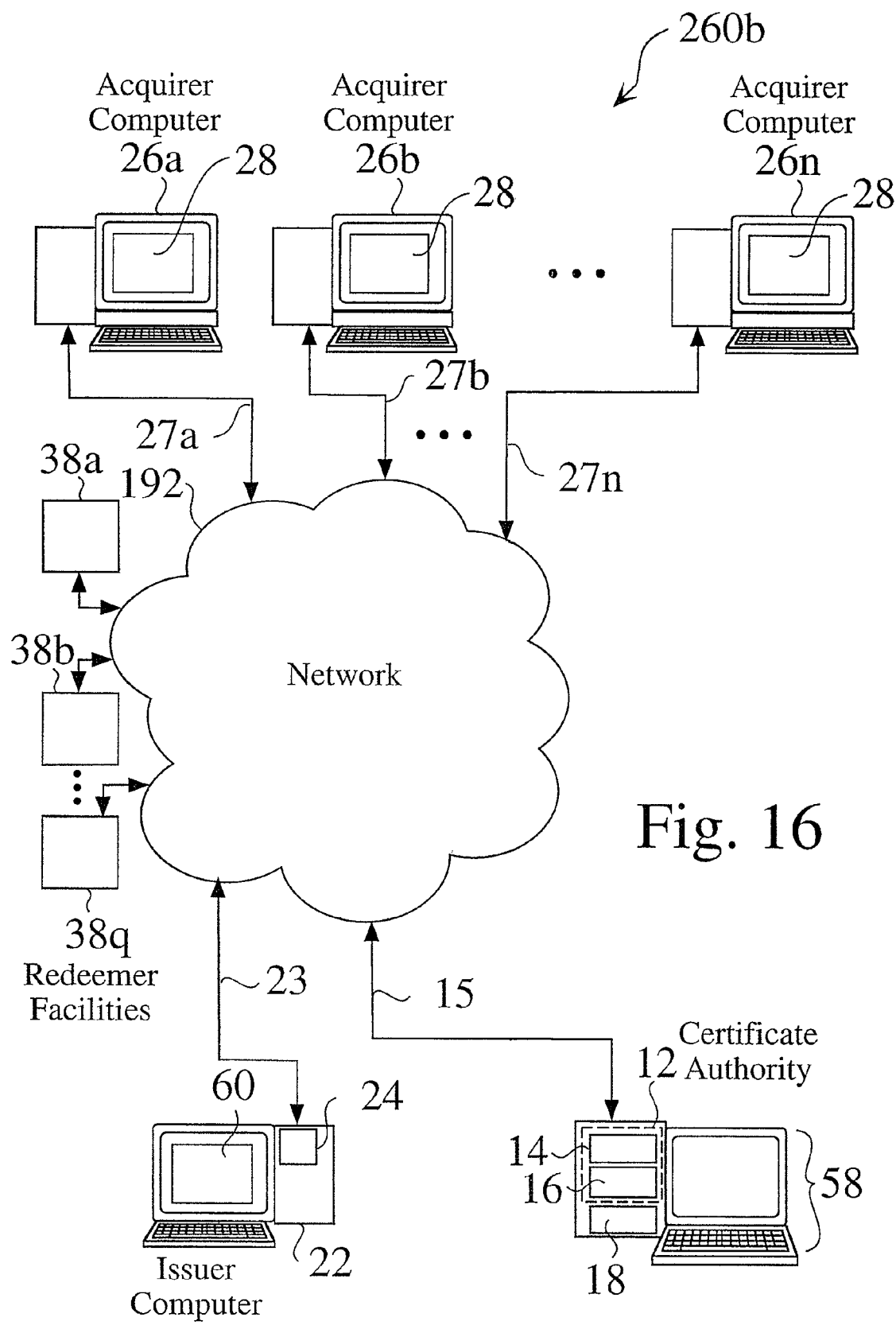
FIG. 16 shows an embodiment of a partial certificate transaction network having a plurality of acquirer terminals, and an issuer terminal having a dedicated certificate authority.

A certificate system 10 which offers payment upon certificate acquisition may be beneficial for "in-house" certificate systems 10, wherein the certificate authority 12 is a dedicated system for an issuer ISR, as seen the certificate network 260b of FIG. 16. However, for issuers and redeemers which are may be small or unknown businesses, acquirer users ACQ may be hesitant to transfer funds from their respective acquirer payment agent 52 until the goods or services are deemed to be acceptable (i.e. at the point of redemption). For large or known issuers ISR, redemption locations RL, and for brand name products, payment upon acquisition may be satisfactory for acquirer users ACQ.

Certificate Systems Having Payment Upon Redemption Transaction. In a preferred embodiment of the certificate system 10, the certificate authority 12 receives an initial authorization to transfer funds from an acquirer payment agent 52, whereby the certificate authority establishes a "lock" on funds as a part of the certificate acquisition transaction 72. The funds are then transferred, from the acquirer payment agent 52 to the redeemer payment agent 56, when a certificate is redeemed 90,104 for actual goods or services, when the redemption transaction is authorized by the certificate authority 12 (e.g. such as by an authentication module 16).

For a certificate system 10 which serves a plurality of issuers ISR, payment upon redemption is often advantageous to acquirer users ACQ. For example, in a large independent certificate system 10, which accepts a plurality of issuers ISR, and allows acquirers ACQ to acquire certificates 60 for a selection of goods and services from the plurality of issuers ISR, it is important that only qualified and legitimate issuers be allowed to market certificates 60. As well, it is important that the issuers ISR clearly describe the products and services which are to be acquired through a redemption of an acquired certificate 60.

For a system in which payment of funds from an acquirer user ACQ is made upon the actual receipt of acceptable products or services, the acquirer ACQ (or alternate recipient RCP) is assured that redemption location RL, as well as the products or services to be received, are legitimate. It is therefore advantageous that issuers and redeemers clearly describe the goods or services which are represented by an acquired certificate 60.

As well, for a certificate system 10 in which payment of funds from an acquirer is made upon the actual receipt of acceptable products or services, the redemption transaction 104 is a true sales transaction, wherein the sale is independent of the certificate entity (except for the authorization to transfer funds). For example, funds are not transferred into or out of a certificate authority account 58, and an acquirer is able to accept or decline the transfer of funds at the time of the redemption transaction 104 (either by redeeming the certificate 60, or by declining a redemption). In such a certificate system, the certificate authority 12 need not accept responsibility for the quality of goods or services, since the redeemer receives funds from the acquirer payment agent 52 during the redemption transaction 104, and the acquirer receives the related goods or services from the redemption location RL during the redemption transaction 104.

Therefore, while an issuer ISR creates a virtual certificate 60 which is acquired through the certificate transaction network 10, the purchase transaction for the goods or services represented by the certificate occurs at the redemption location RL, through the merchant's point of sale terminal 40, with final redemption authorization of acquirer funds handled by the certificate authority 12.

In the preferred certificate system 10 wherein payment is not transferred until actual redemption of the certificate 60, buyers are inherently protected from mis-represented goods or services, or from illegitimate certificate issuers ISR. If a customer, such as an acquirer user, or a recipient of a certificate 60 (and accompanying private key 76), decides not to redeem the certificate, or upon visiting a redemption location RL, decides against the transaction for any reason, the customer may, at their discretion, decide against proceeding with the redemption transaction 104. Since the customer is not charged for the sale unless a redemption transaction 104 is actually made, the customer is inherently protected, since the certificate system 10 minimizes misrepresentation of goods and services by issuers ISR.

For an acquirer who decides not to proceed with a redemption transaction 104, the acquirer may simply let the acquired certificate 60 "expire", or may actively return to the purchasing site, such as through the acquirer facilities, and actively cancel the certificate 60, while suspending the authorized lock on the acquirer's funds.

The enhanced level of protection for the buyer provided by the certificate system 10 is advantageous for many redemption circumstances. While business and personal travelers commonly purchase travel tickets (e.g. such as airline tickets, train tickets, accommodations, and car rentals) at the present time, funds are still transferred when the tickets are sent to or reserved for the acquirer. If travel plans are changed, or if flights are changed, buyers have little or no financial leverage. In contrast to conventional ticketing and reservations, if travel plans are changed, or if a flight is canceled, a customer in possession of an applicable certificate 60 can easily modify their travel plans, without being charged.

While authorization to charge against an acquirer's payment agent 52 (e.g. such as a credit card) is first established at the time the acquirer first acquires a certificate 60, funds are not typically transferred during the initial authorization. Instead, the initial authorization acts to validate an acquirer's payment agent 52, while performing a preliminary test for funds, which are to be typically charged later, during a second redemption transaction 104.

The second authorization against the acquirer's funds takes place when the certificate is redeemed. While the initial authorization typically confirms available credit for an acquirer, and typically establishes a hold on appropriate funds for the certificate 60, the fund hold may either be held in place indefinitely until redemption, or may expire before the redemption of the certificate. For a fund hold which expires before a certificate is redeemed, a redeemer may still gain authorization to charge the acquirer's payment agent 52, during the redemption transaction 90 (such as be re-entering the credit information).

The certificate system 10 therefore provides a mutually safe and fair means for commerce between an acquirer and an issuer, since, the acquirers ACQ are properly authorized (both during the initial acquisition of the certificate and during the redemption transaction 104), while the holder of the certificate 60 (i.e. the acquirer or an authorized recipient of an acquired certificate) is also able to accept or decline the redemption transaction 90 (e.g. such as upon visiting the redemption location, if the goods or services are not satisfactory).

In this preferred embodiment of the certificate system, funds are never transferred to the hosting certificate system 10, but are only transferred, upon a redemption transaction 104, from the acquirer payment agent 52, either to the issuer payment agent 54, or to the redeemer payment agent 56. In this mode of operation, a second authorization is required at the time the certificate is redeemed, to authorize transfer of funds, and to initiate the actual transfer of funds.

Financial institutions which offer credit card systems typically charge merchant businesses different discount rates (e.g. typically a percentage of each sale), based upon the type of sales transactions. Many financial institutions charge different rates for credit card present transactions, credit card not present transactions, and internet transactions, with the greatest rates typically charged to internet transactions (typically since fraudulent use of credit cards is currently more prevalent on the internet).

However, within the certificate system 10, for embodiments where funds are initially locked during the acquisition, and where a second authorization takes place upon redemption of an acquired certificate, funds are transferred at the redemption level. For an acquirer user who has a card present for redemption authorization, there is a reasonable level of security for the merchant that the card is valid. Even for a an acquirer or recipient who is in possession of the certificate 60 and the private key 76, the redemption transaction is significantly more secure than a remote internet transaction. Therefore, a merchant is more likely to pay less to the credit card issuing agency.

Figure 15:
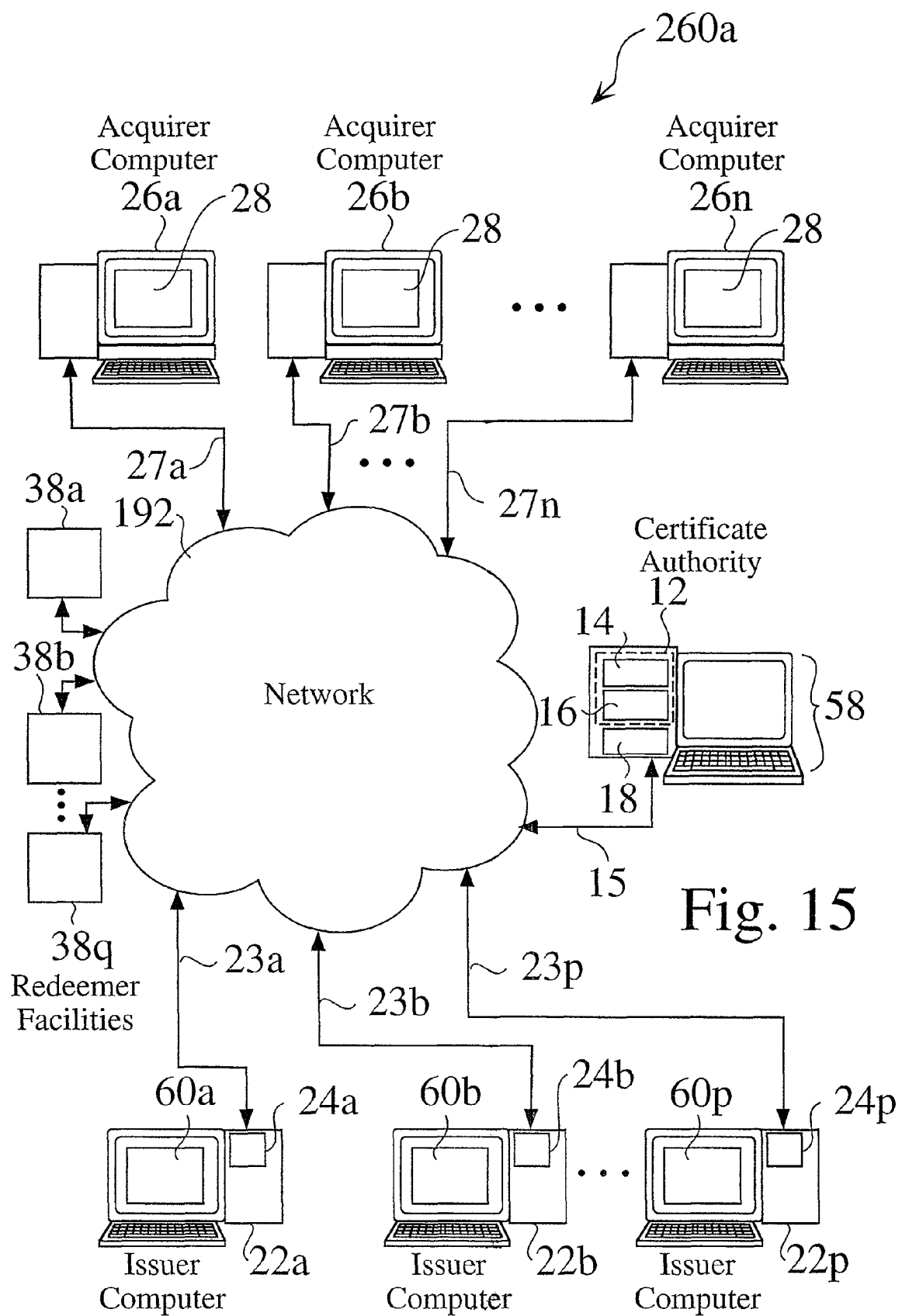
FIG. 15 shows an embodiment of a partial certificate transaction network having a plurality of issuers, a plurality of acquirers, and a remote certificate authority.

System Structures. The certificate system 10 may operate across a wide variety of networks 192, and may be easily adapted to promote various commerce models. FIG. 15 shows one network embodiment 260*a* of a certificate system 10 implemented across a network 192, having a plurality of issuer terminals 22*a*-22*p*, each having issuer facilities 24*a*-24*p*, and network connection 23*a*-23*p*; a remote certificate authority 12, including a certificate module 14, an authentication module 16, a database 18, and an authority terminal 58. A plurality of acquirer terminals 26*a*-26*n*, each having acquirer facilities 28*a*-28*n*, and network connections 27*a*-27*n*, are connected to network 192, such that a plurality of acquirer users may browse and acquire certificates 60 which are created by a plurality of issuer users at issuer terminals 22*a*-22*p*.

FIG. 16 shows an embodiment of an alternate network embodiment 260*b* of a certificate system 10 implemented across a network 192 having a single issuer terminal 22, with issuer facility 24, and a network connection 23*a*-23*p* and a related dedicated certificate authority 12, including a certificate module 14, an authentication module 16, a database 18, and an authority terminal 58. For a large issuer ISR, such as a conglomerate which provides a large selection of products or services at a plurality of locations RL, a dedicated certificate authority system 12,14,16,18,58 may preferably be used to manage a large virtual inventory of 228 certificates 60 on an issuer network site 242. A plurality of acquirer terminals 26*a*-26*n*, each having acquirer facilities 28*a*-28*n* and network connections 27*a*-27*n*, are connected to network 192, such that a plurality of acquirer users ACQ may browse and acquire certificates 60 within the virtual inventory 228 of the merchant site 242.

System Applications and Alternative Embodiments. The certificate system 10 can be used for a large variety of commerce applications, wherein products and services are located on-line, but are picked up at a store. For example, an acquirer user ACQ may locate a large gift item on-line (e.g. such as a television set), which can be picked up at a location RL near a recipient RCP. The acquirer user ACQ may simply search for and locate the desired gift item at a location RL near the recipient RCP, proceed with an acquisition transaction 72, transfer the acquired certificate 60 (or just the certificate information 74) to the recipient RCP (or directly to the redemption location RL), and communicate the private key to the recipient RCP. The recipient RCP may then perform the redemption transaction 90, and receive the gift item.

In a similar embodiment, an acquirer user ACQ may desire to send a gift certificate with a selected money denomination 64 to a recipient RCP. With the certificate information 74 and the private key 76, the recipient RCP can either visit the redemption location RL directly, or may alternately browse on-line through an aggregate site or a merchant site, to locate desired goods or services, before picking the desired goods up at the redemption location RL.

The certificate system 10 can also be used for travel and accommodations, and for various ticketing applications, As well, the certificate system 10 may be used as a secure currency, in the form of "traveler's" certificates, which are acquired online, but are spent or cashed at one or more locations RL. As well, the certificate system may be used to prepay for services, such as for medical or dental services, or even home repair.

The certificate system 10 may be alternately used for business vouchers systems, in which personnel, such as employees, are sent to pick up and deliver goods and services, using single-use certificates 60 to provide for the secure transfer of various forms of inventory.

As described above, the certificate system 10 does not require that monetary funds are transferred, or that the system be used exclusively for purchasing products or services. For example, the certificate system 10 may be used to distribute discount coupons for one or more issuers ISR, which are typically redeemable as a discount for an acquired product or service. While virtual coupons are similar to virtual certificates 60 there is typically no monetary value associated with a virtual coupon, such that there may be no private key verification required during a redemption transaction 90. An acquirer user ACQ simply accesses a desired virtual coupon (e.g. such as for a related search for products or businesses within their regional area), and prints a desired coupon on an acquirer printer 30. The acquirer user ACQ may then visit a related redemption location RL (i.e. the selected store), which honors and redeems the coupon (typically as a discount for a product or service specified on the virtual coupon).

A merchant issuer may preferably combine the use of virtual certificates 60 with that of virtual coupons, such as through virtual site, wherein an acquirer user may receive a discount that is related to the acquisition of one or more certificates 60. For example, to promote the redemption location RL, an issuer user may provide an acquirer user with a virtual discount coupon, as a bonus for prior certificate purchases.

System Advantages. Retailers, such as small merchants, may easily establish means for selling their goods and services online, without the requirement of establishing an extensive online presence. Issuers may simply register their business with the certificate authority 12, and then may create virtual certificates 60 for one or more of their products and services. Virtual certificates 60 can be offered for acquisition at one or more sites, such as an aggregated site 234 for a large variety of products and services within a selected region, or a more specialized site 234 that is related to specific types of products or services within their area.

As well, even without a web site, an issuer/merchant can input other store information 252a,252b (such as business location information, logos, product descriptions) to appear on a web page 248,252 appropriate to a virtual certificate 60, as well as acceptable credit cards 52 for the issuer/merchant. When an acquirer ACQ navigates to a description of a virtual certificate within a site 248, such as by limiting a search to a specific product category within a specified zip code region, the issuer/merchant information 252 is preferably displayed, in conjunction with the virtual certificate 60, thereby creating a network presence for the issuer/merchant. As well, if an acquirer ACQ selects the certificate 60 (i.e. decides to acquire the certificate), the acquirer facility 28 typically displays an acquisition invoice module 252 that is specific to an issuer/merchant for the selected certificate 60, wherein selectable payment agent information (i.e. accepted credit cards) are limited to cards which the issuer accepts at the redemption location RL.

Through the certificate system 10, acquirers are able to find goods and services that they might not have been able to find otherwise. As well, acquirers are able to secure a price for a transaction at the time they acquire a certificate 60. The certificate authority creates a virtual inventory 228 of virtual certificates 60, there is no inventory of paper-based certificates or coupons.

Although the certificate system 10 and its methods of use are described herein in connection with retail certificates offered through web sites, the apparatus and techniques can be implemented for other certificate, coupon, voucher, or token system, and over different types of networks, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A computer certificate system, comprising:
 a certificate authority connected to a network, said certificate authority comprising a first set of program instructions stored in a tangible computer readable medium, that when executed by a computing device, causes said certificate authority to:
  display an issuer interface for receiving input, wherein said input defines a virtual certificate comprising a redemption denomination; and
  associate a first public key identifier with said virtual certificate;
 a certificate issuance module comprising a second set of program instructions stored in a tangible computer readable medium, that when executed by a computing device, causes said certificate issuance module to:
  receive a private key identifier established by an acquirer; and
  create an issued certificate said issued certificate comprising unique identifier information, wherein said unique identifier information comprises said redemption denomination, said private key identifier, and said first public key identifier, wherein said unique identifier information is stored at said certificate authority in association with said issued certificate; and
 a certificate authentication module comprising a third set of program instructions stored in a tangible computer readable medium, that when executed by a computing device, causes said certificate authentication module to:
  authorize a redemption of said issued certificate at a redemption location, based upon receiving said redemption denomination, said first public key identifier, and said private key identifier, and a matching comparison to said unique identifier information stored at said certificate authority; and
 cancel further redemption of said issued certificate at said certificate authority.

2. The computer certificate system of claim 1, said issued certificate further comprising:
 a single-use certificate comprising at least one design element, a denomination, at least one redemption rule, and identification information comprising human readable information, machine readable information, or both.

3. The computer certificate system of claim 1, wherein said second set of program instructions stored in a tangible computer readable medium, when executed by a computing device, further causes said certificate issuance module to:
 receive issuer input for at least one customized virtual certificate; and
 direct said certificate authority to create said at least one customized virtual certificate for subsequent issuance at one or more acquirer terminals.

4. The computer certificate system of claim 3, wherein said first set of program instructions stored in a tangible computer readable medium, when executed by a computing device, further causes the certificate authority to-display an issuer interface for control of modular design of one or more virtual certificates independently by:

selection of standard designs offered by said certificate authority;

an upload of one or more custom designs to said certificate authority in the form of at least one computer file; or a specification that a certificate be issued using a combination of stock elements uploaded through said issuer terminal.

5. The computer certificate system of claim 1, further comprising:

an issuer facility for authorization of construction of certificates through a web portal via a network;

said issuer facility comprising a certificate specification interface configured to receive input comprising-detailed specifications for virtual single-use certificates.

6. The computer certificate system of claim 1, wherein said certificates reflect sellable or distributable commodities comprising products, services, or both that are available for pick up at one or more redemption locations.

7. The computer certificate system of claim 1, wherein said second set of program instructions stored in a tangible computer readable medium, when executed by a computing device, further causes said certificate issuance module to:

display an acquirer interface configured to receive input that identifies redemption locations for one or more products or services that are available as selectable virtual certificates; and receive via the acquirer interface an indication to initiate a search via the acquirer interface and responsively display a browseable subset of an entire virtual inventory or of an aggregate inventory that matches search limiters received via said acquirer interface.

8. The computer certificate system of claim 1, wherein said second set of program instructions stored in a tangible computer readable medium, when executed by a computing device, further causes the certificate issuance module to:

transmit a message indicating an acquisition transaction;

wherein a product or service that is to be received upon redemption is reserved;

wherein, if a product is reserved, a product within an inventory at a redemption location is placed on hold; and wherein, for a designated service, acquisition information is usable to schedule personnel or equipment, or to limit further sale of the product or service.

9. The computer certificate system of claim 1, wherein said first set of program instructions stored in a tangible computer readable medium, when executed by a computing device, further causes said certificate authority to:

receive issuer information;

receive denomination parameters for said virtual certificate in the form of any of a currency denomination or a code associated with a product, a service, a coupon, a voucher, or other instrument for which an acquired certificate is redeemable; and authorize said certificate authority to issue certificates within a set range of selectable denominations or authorize creation of virtual certificates with a value received from said acquirer.

10. The computer certificate system of claim 1, wherein said first set of program instructions stored in a tangible computer readable medium, when executed by a computing device, further causes the certificate authority to:

receive redemption rules comprising any of an expiration date, any exclusion of redemption on a basis of geographic location, or other redemption rules.

11. The computer certificate system of claim 1, wherein said first set of program instructions stored in a tangible computer readable medium, when executed by a computing device, further causes the certificate authority to:

receive issuance restrictions for-limiting a number of acquired certificates to be issued by said certificate authority on behalf of at least one issuer.

12. The computer certificate system of claim 1, wherein said first set of program instructions stored in a tangible computer readable medium, when executed by a computing device, further causes the certificate authority to:

receive input defining a format for a unique certificate supplementary public key identification; and select or specify a unique certificate public key identification that corresponds to existing product codes, inventory, or existing issuer certificate systems.

13. A process, comprising:

defining a virtual certificate, said defined virtual certificate comprising a redemption denomination;

associating a first public key identifier with said defined virtual certificate;

receiving a private key identifier established by an acquirer;

creating an issued certificate in response to acquisition of said defined virtual certificate by an acquirer, said issued certificate comprising unique identifier information, wherein said unique identifier information comprises said redemption denomination, said private key identifier, and said first public key identifier, wherein said unique identifier information is stored at certificate authority in association with said issued certificate;

authorizing a redemption of said issued certificate at a redemption location to a holder of said issued certificate, based upon receiving said redemption denomination, said private key identifier, and said first public key identifier from said holder, and a matching comparison to said unique identifier information stored at said certificate authority; and disabling further redemption of said issued certificate at said certificate authority.

14. The process of claim 13, said issued certificate further comprising:

a single-use certificate comprising at least one design element, a denomination, at least one redemption rule, and identification information comprising human readable information, machine readable information, or both.

15. The process of claim 13, further comprising receiving issuer input for at least one customized virtual certificate; and directing said certificate authority to create said at least one customized virtual certificate for subsequent issuance at one or more acquirer terminals.

16. The process of claim 13, further comprising:

providing an issuer facility for authorization of construction of certificates through a web portal via a network, wherein said issuer facility connects to said certificate authority; and said issuer facility further comprising a certificate specification interface for receiving input that defines detailed specifications for virtual single-use certificates.

17. The method of claim 13, further comprising:

controlling modular design of one or more virtual certificates independently, either by selecting standard designs offered by said certificate authority, by uploading one or more custom designs to said certificate authority in the form of one or more computer files, or by specifying that a certificate be issued using a combination of stock elements uploaded through said issuer terminal.

18. The process of claim 13, further comprising:

receiving input from one or more redemption locations for one or more products or services which are available as selectable virtual certificates; and receiving an indication to initiate a search, as well as one or more search limiters for the search, and responsively initiating display of a browseable subset of a virtual inventory or of an aggregate inventory which matches said one or more search limiters.

19. The process of claim 13, further comprising:

said certificate authority communicating an acquisition transaction;

wherein a product or service that is to be received upon redemption is reserved;

wherein, if a product is reserved, a product within an inventory at a redemption location is placed on hold; and wherein acquisition information is usable to schedule personnel or equipment, or to limit further sale of the product or service.

20. The process of claim 13, further comprising:

receiving issuer information;

receiving denomination parameters for a virtual certificate in the form of any of a currency denomination or a code associated with a product, a service, a coupon, a voucher, or other instrument for which an acquired certificate is redeemable; and— receiving authorization to issue certificates within a set range of selectable denominations, or to create virtual certificates with a value received from said acquirer.

21. The process of claim 13, further comprising:

receiving redemption rules comprising at least one of an expiration date, any exclusion of redemption on a basis of geographic location, or other redemption rules unique to said issuer.

22. The process of claim 13, further comprising:

receiving issuance restrictions at said certificate authority for any of limiting a number of acquired certificates to be issued by said certificate authority on behalf of an issuer, for any of a specified time frame, within a geographic region, or on a basis of other criteria unique to said issuer.

23. The process of claim 13, further comprising:

receiving input that defines a format for a unique certificate supplementary public key identification;

wherein said unique certificate supplementary public key identification corresponds to existing product codes, inventory, or existing issuer certificate systems.

24. An article of manufacture including a computer-readable medium having instructions stored thereon that, if executed by a computing device, cause the computing device to perform operations comprising:

receiving data for creating a virtual certificate, said virtual certificate comprising a redemption denomination, wherein said data for creating said virtual certificate is received via an issuer interface;

associating a public key identifier with said virtual certificate;

receiving a private key identifier established by an acquirer;

receiving a certificate request and responsively creating an issued certificate of said virtual certificate, said issued certificate including said redemption denomination, said private key identifier, and said public key identifier;

storing said redemption denomination, said private key identifier, and said public key identifier in association with said issued certificate;

receiving a redemption request for said issued certificate from a holder of said issued certificate and responsively authorizing a redemption of said issued certificate to said holder, wherein said redemption is authorized based upon receipt of said redemption denomination, said private key, and said public key identifier, and a matching comparison of said redemption denomination, said private key identifier, and said public key identifier stored at said computer certificate system; and canceling further redemption of said issued certificate.

* * * * *

UNITED STATES PATENT AND TRADEMARK OFFICE
CERTIFICATE OF CORRECTION

| | | |
|---|---|---|
| PATENT NO. | : 7,899,755 B2 | |
| APPLICATION NO. | : 11/686239 | |
| DATED | : March 1, 2011 | |
| INVENTOR(S) | : Whitfield | |

It is certified that error appears in the above-identified patent and that said Letters Patent is hereby corrected as shown below:

Title Page, item (65) under "Prior Publication Data", in Column 1, Line 1, below "US 2007/0157021 A1 Jul. 5, 2007" insert -- US 2011/0060904 A9 Mar. 10, 2011 --.

Title Page, item (57) under "Abstract", in Column 2, Line 4, delete "a issuer" and insert -- an issuer --.

Title Page 2, item (56), under "Other Publications", in Column 2, Line 19, delete "olf" and insert -- of --.

Title Page 2, item (56), under "Other Publications", in Column 2, Line 19, delete "Paymetn" and insert -- Payment --.

Title Page 2, item (56), under "Other Publications", in Column 2, Line 23, delete "Labratories," and insert -- Laboratories, --.

Title Page 2, item (56), under "Other Publications", in Column 2, Line 26, delete "Labratories," and insert -- Laboratories, --.

Title Page 2, item (56), under "Other Publications", in Column 2, Line 28, delete "Labratories," and insert -- Laboratories, --.

Title Page 2, item (56), under "Other Publications", in Column 2, Line 48, delete "1-category=54." and insert -- 1~category=54. --.

Title Page 2, item (56), under "Other Publications", in Column 2, Line 53, delete "Recives" and insert -- Receives --.

Column 24, Line 65, in Claim 4, delete "to-display" and insert -- to display --.

Signed and Sealed this
Fifth Day of July, 2011

David J. Kappos
*Director of the United States Patent and Trademark Office*

CERTIFICATE OF CORRECTION (continued)
U.S. Pat. No. 7,899,755 B2

Column 25, Lines 13-14, in Claim 5, delete "comprising-detailed" and insert -- comprising detailed --.

Column 26, Line 3, in Claim 11, delete "for-limiting" and insert -- for limiting --.

Column 26, Line 46, in Claim 15, delete "comprising" and insert -- comprising: --.

Column 27, Line 27, in Claim 20, delete "and—" and insert -- and --.